(12) United States Patent
Shock

(10) Patent No.: US 10,633,243 B2
(45) Date of Patent: *Apr. 28, 2020

(54) MOBILE DISTRIBUTION STATION

(71) Applicant: Fuel Automation Station, LLC, Birmingham, MI (US)

(72) Inventor: Ricky Dean Shock, Victoria, TX (US)

(73) Assignee: FUEL AUTOMATION STATION, LLC., Birmingham, MI (US)

( * ) Notice: Subject to any disclaimer, the term of this patent is extended or adjusted under 35 U.S.C. 154(b) by 118 days.

This patent is subject to a terminal disclaimer.

(21) Appl. No.: 15/903,315

(22) Filed: Feb. 23, 2018

(65) Prior Publication Data
US 2018/0290877 A1   Oct. 11, 2018

Related U.S. Application Data

(60) Provisional application No. 62/463,109, filed on Feb. 24, 2017.

(51) Int. Cl.
*B67D 7/50* (2010.01)
*B67D 7/52* (2010.01)
(Continued)

(52) U.S. Cl.
CPC .............. *B67D 7/52* (2013.01); *B65H 75/425* (2013.01); *B65H 75/4402* (2013.01);
(Continued)

(58) Field of Classification Search
CPC . B67D 7/04; B67D 7/40; B67D 7/465; B67D 7/845; B67D 2210/0006
(Continued)

(56) References Cited

U.S. PATENT DOCUMENTS 2,340,070 A    1/1944   McCauley et al.
2,516,150 A    7/1950   Samiran
(Continued)

FOREIGN PATENT DOCUMENTS

DE    1147397    4/1963
DE    20106400   10/2001
(Continued)

OTHER PUBLICATIONS

Shimazaki, H. (1986). Development of centralized fueling and management system of kerosene heating machine. Nisseki Technical Review, vol. 28(4). Jul. 1986. pp. 184-188.
(Continued)

*Primary Examiner* — Timothy L Maust
(74) *Attorney, Agent, or Firm* — Carlson, Gaskey & Olds, P.C.

(57) ABSTRACT

A distribution station includes a mobile trailer, a pump, a manifold, a fluid line connecting the pump to the manifold, and a bypass line leading into the fluid line between the pump and the manifold. The bypass line permits fluid to be provided to the manifold without use of the pump. Reels on the mobile trailer are individually connected with the manifold, and hoses are connected with a different one of the reels. Valves on the mobile trailer are situated between the manifold and different ones of the reels. Fluid level sensors are connectable to the ends of different ones of the hoses. A controller is configured to individually open and close the valves responsive to the fluid level sensors.

19 Claims, 25 Drawing Sheets

(51) Int. Cl.

| | | |
|---|---|---|
| *B67D 7/84* | (2010.01) | |
| *B67D 7/40* | (2010.01) | |
| *B67D 7/78* | (2010.01) | |
| *B67D 7/36* | (2010.01) | |
| *B67D 7/62* | (2010.01) | |
| *B67D 7/04* | (2010.01) | |
| *B65H 75/42* | (2006.01) | |
| *B65H 75/44* | (2006.01) | |
| *B67D 7/32* | (2010.01) | |
| *B62D 63/08* | (2006.01) | |
| *E21B 43/26* | (2006.01) | |
| *B60P 3/035* | (2006.01) | |

(52) U.S. Cl.
CPC .......... *B65H 75/4478* (2013.01); *B67D 7/04* (2013.01); *B67D 7/362* (2013.01); *B67D 7/40* (2013.01); *B67D 7/62* (2013.01); *B67D 7/78* (2013.01); *B67D 7/845* (2013.01); *B60P 3/035* (2013.01); *B62D 63/08* (2013.01); *B65H 2701/33* (2013.01); *B67D 7/3272* (2013.01); *E21B 43/26* (2013.01)

(58) Field of Classification Search
USPC ..................................... 141/231; 137/565.35
See application file for complete search history.

(56) References Cited

U.S. PATENT DOCUMENTS

| | | | |
|---|---|---|---|
| 2,698,112 A * | 12/1954 | Herderhorst .............. B64F 1/28 | |
| | | | 222/72 |
| 2,769,572 A | 11/1956 | Harman et al. | |
| 2,777,461 A | 1/1957 | Wildhaber | |
| 2,966,921 A | 1/1961 | Whiteman | |
| 3,028,010 A * | 4/1962 | Headrick .................. B64F 1/28 | |
| | | | 210/172.1 |
| 3,136,295 A | 6/1964 | Gramo | |
| 3,547,141 A | 12/1970 | Alexander | |
| 3,605,798 A | 9/1971 | Green et al. | |
| 3,618,643 A | 11/1971 | Thomson | |
| 3,625,399 A | 12/1971 | Heisler | |
| 3,656,134 A | 4/1972 | Brown | |
| 3,677,284 A | 7/1972 | Mendez | |
| 3,881,509 A | 5/1975 | Newton | |
| 4,139,019 A * | 2/1979 | Bresie ..................... F17C 5/002 | |
| | | | 137/351 |
| 4,284,210 A | 8/1981 | Horak | |
| 4,511,311 A | 4/1985 | Olson | |
| 4,591,115 A | 5/1986 | DeCarlo | |
| 4,651,788 A | 3/1987 | Grosskreuz et al. | |
| 4,728,005 A | 3/1988 | Jacobs et al. | |
| 4,930,665 A | 6/1990 | Devine | |
| 5,406,988 A | 4/1995 | Hopkins | |
| 5,454,408 A | 10/1995 | DiBella et al. | |
| 5,465,766 A | 11/1995 | Siegele et al. | |
| 5,503,199 A | 4/1996 | Whitley, II et al. | |
| 5,538,051 A | 7/1996 | Brown et al. | |
| 5,551,309 A | 9/1996 | Goossens et al. | |
| 5,651,400 A | 7/1997 | Corts et al. | |
| 5,660,358 A | 8/1997 | Grafwallner et al. | |
| 5,708,424 A | 1/1998 | Orlando et al. | |
| 5,749,339 A | 5/1998 | Graham et al. | |
| 5,887,567 A * | 3/1999 | White ....................... B61C 5/00 | |
| | | | 123/294 |
| 5,927,603 A | 7/1999 | McNabb | |
| 5,884,675 A | 12/1999 | Krasnov | |
| 6,098,646 A | 8/2000 | Hennemann et al. | |
| 6,176,279 B1 * | 1/2001 | Dahlin .................... B61K 11/00 | |
| | | | 137/234.6 |
| 6,206,056 B1 | 3/2001 | Lagache | |
| 6,382,272 B1 * | 5/2002 | Dahlin ..................... B60P 3/14 | |
| | | | 137/351 |
| 6,564,615 B1 | 5/2003 | Carter | |
| 6,601,000 B1 | 7/2003 | Barlian et al. | |
| 6,651,706 B2 | 11/2003 | Litt | |
| 6,697,705 B2 | 2/2004 | Johnson et al. | |
| 6,745,801 B1 | 6/2004 | Cohen et al. | |
| 6,755,225 B1 | 6/2004 | Niedwiecki et al. | |
| 6,761,194 B1 | 7/2004 | Blong | |
| 6,779,569 B1 | 8/2004 | Teer, Jr. et al. | |
| 6,786,245 B1 | 9/2004 | Eichelberger et al. | |
| 6,867,729 B2 | 3/2005 | Berry et al. | |
| 7,063,276 B2 | 6/2006 | Newton | |
| 7,106,026 B2 | 9/2006 | Moore | |
| 7,353,808 B2 | 4/2008 | Kakoo | |
| 7,401,511 B2 | 7/2008 | Dietmeier | |
| 7,415,995 B2 | 8/2008 | Plummer et al. | |
| 7,458,543 B2 | 12/2008 | Cutler et al. | |
| 7,568,507 B2 | 8/2009 | Farese et al. | |
| 7,610,806 B2 | 11/2009 | Skinner | |
| 7,602,143 B2 | 12/2009 | Capizzo | |
| 7,628,182 B2 | 12/2009 | Poulter | |
| 7,937,215 B2 | 5/2011 | Humphrey | |
| 7,938,151 B2 | 5/2011 | Hockner | |
| 8,069,885 B2 | 12/2011 | Kederer et al. | |
| 8,448,750 B2 | 5/2013 | Gaugush et al. | |
| 8,959,998 B2 | 2/2015 | Birtcher et al. | |
| 9,346,662 B2 * | 5/2016 | Van Vliet ................ B67D 7/04 | |
| 9,371,830 B2 | 6/2016 | Moffitt, Jr. | |
| 9,371,831 B2 | 6/2016 | Moffitt, Jr. | |
| 9,434,598 B2 | 9/2016 | Pick et al. | |
| 9,586,805 B1 | 3/2017 | Shock | |
| 9,725,295 B2 | 8/2017 | McKay et al. | |
| 9,981,840 B2 * | 5/2018 | Shock .................... B67D 7/465 | |
| 2001/0017815 A1 | 8/2001 | Ackermann et al. | |
| 2004/0163731 A1 | 8/2004 | Eichelberger et al. | |
| 2004/0187950 A1 | 9/2004 | Cohen et al. | |
| 2005/0109561 A1 | 5/2005 | Chopra | |
| 2007/0079891 A1 | 4/2007 | Farese et al. | |
| 2007/0164031 A1 | 7/2007 | Holz | |
| 2007/0181212 A1 * | 8/2007 | Fell .......................... B60P 3/14 | |
| | | | 141/231 |
| 2008/0078244 A1 | 4/2008 | Dietmeier | |
| 2009/0314384 A1 * | 12/2009 | Brakefield ............... B67D 7/04 | |
| | | | 141/67 |
| 2010/0018605 A1 | 1/2010 | Bentivoglio | |
| 2011/0197988 A1 | 8/2011 | Van Vliet et al. | |
| 2016/0076533 A1 | 3/2016 | Moffitt, Jr. | |
| 2017/0246977 A1 * | 8/2017 | McGuffin ............... F02M 37/00 | |
| 2017/0283240 A1 * | 10/2017 | Wruck .................. B60P 3/2215 | |
| 2019/0119096 A1 * | 4/2019 | Haile ................... B67D 7/0401 | |

FOREIGN PATENT DOCUMENTS

| | | |
|---|---|---|
| DE | 10309307 | 9/2004 |
| DE | 102006025025 | 12/2006 |
| DE | 102006038652 | 2/2008 |
| EP | 0161042 | 11/1985 |
| EP | 0433041 | 6/2001 |
| GB | 2485832 | 5/2012 |
| RU | 28347 | 3/2003 |
| RU | 91135 | 1/2010 |
| RU | 2452668 | 1/2012 |
| SU | 949644 | 8/1982 |
| WO | 0177006 | 10/2001 |
| WO | 03029721 | 4/2003 |
| WO | 03093118 | 11/2003 |
| WO | 2006005686 | 1/2006 |
| WO | 2006116572 | 11/2006 |
| WO | 2007087849 | 8/2007 |
| WO | 2008083830 | 7/2008 |
| WO | 2009026607 | 3/2009 |
| WO | 20090608065 | 6/2009 |

OTHER PUBLICATIONS

Technical Document. Surface vehicle standard. SAE International. Sep. 2014. pp. 1-5.

Oilfield Business: Technologies. Frac Shack Inc. introduces world's first Bi-Fuel Distribution Unit for hydraulic fracturing industry.

(56) References Cited

OTHER PUBLICATIONS

Texas Oil & Gas: The National Magazine for Oil & Gas in Texas. vol. 4, Issue 2. 2015. p. 27.
Frac Shack International. Publications & Endorsements. Retrieved Aug. 23, 2016 from: http://www.fracshack.com.
Frac Shack International. Technology. Retrieved Aug. 23, 2016 from: http://www.fracshack.com.
Frac Shack International. Design Benefits. Retrieved Aug. 23, 2016 from: http://www.fracshack.com.
Frac Shack International. Service. Retrieved Aug. 23, 2016 from: http://www.fracshack.com.
Frac Shack International. Frac Shack Series—Series A. Retrieved Aug. 23, 2016 from: http://www.fracshack.com.
Frac Shack International. Frac Shack Series—Series B. Retrieved Aug. 23, 2016 from: http://www.fracshack.com.
Frac Shack International. Frac Shack Series—Series C. Retrieved Aug. 23, 2016 from: http://www.fracshack.com.
Frac Shack International. Frac Shack Series—Series D. Retrieved Aug. 23, 2016 from: http://www.fracshack.com.
Frac Shack International. Frac Shack Series—Series E. Retrieved Aug. 23, 2016 from: http://www.fracshack.com.
Frac Shack International. Frac Shack Series—Series EG. Retrieved Aug. 23, 2016 from: http://www.fracshack.com.
Mann Tek. Dry Disconnect Couplings. Retrieved Jul. 22, 2016 from: http://www.manntek.com/products/drydisconnectcouplings p. 1-4.
Mann Tek. Dry Aviation Couplings. Retrieved Jul. 22, 2016 from: http://www.manntek.com/products/dryaviationcouplings p. 1-4.
Waterman, J. (2013). Better Safe than Sorry: Frac Shack a welcome addition to the oil patch. Jan. 2, 2013. Retrieved Aug. 23, 2016 from: http://www.pipelinenewsnorth.ca/better-safe-than-sorry-1.1123066.
U.S. Appl. No. 15/655,115, filed Jul. 20, 2017.
U.S. Appl. No. 15/782,335, filed Oct. 12, 2017.
U.S. Appl. No. 15/673,730, filed Aug. 10, 2017.
U.S. Appl. No. 15/673,796, filed Aug. 10, 2017.
U.S. Appl. No. 15/416,198, filed Jan. 26, 2017.
U.S. Appl. No. 15/703,285, filed Sep. 13, 2017.

* cited by examiner

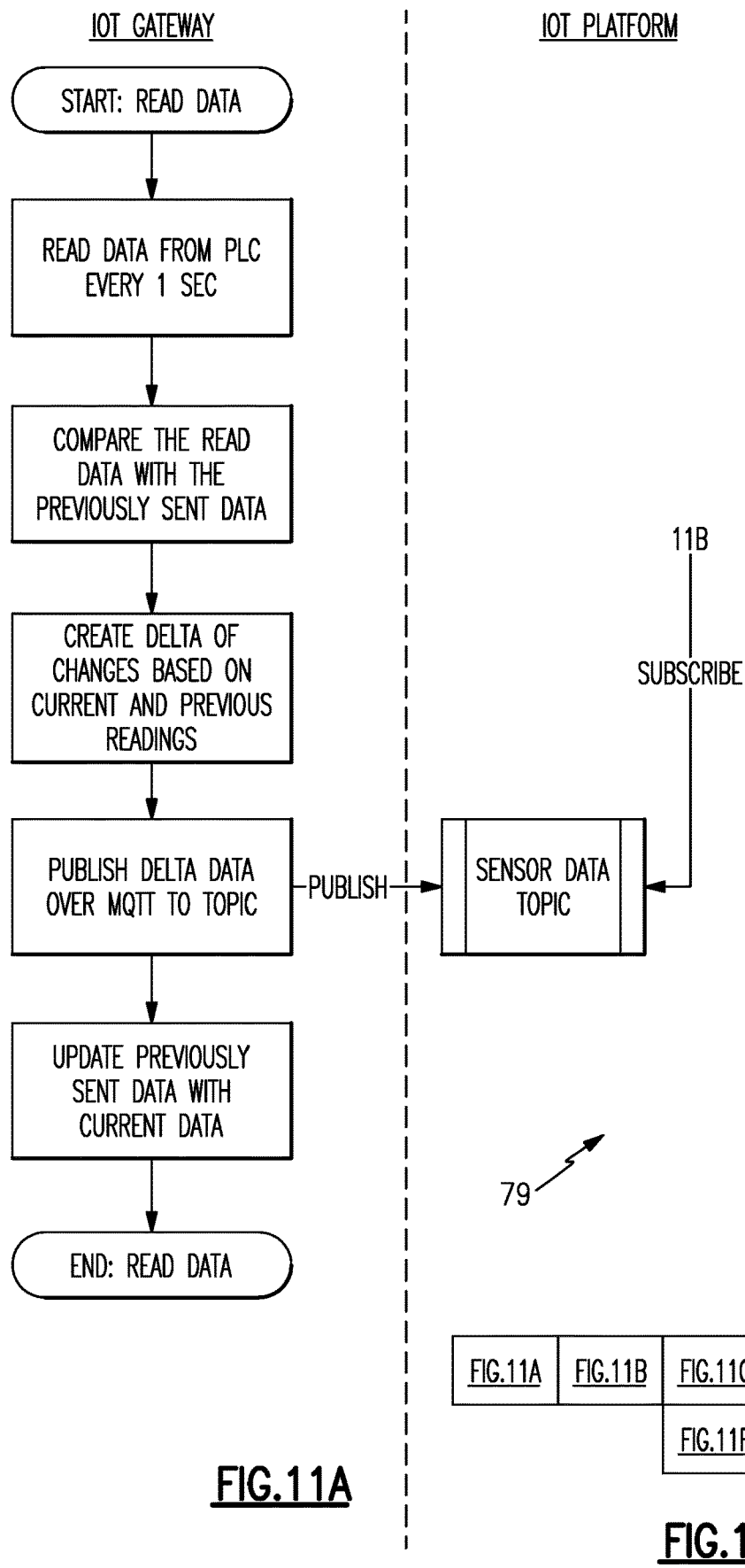

MOBILE DISTRIBUTION STATION

CROSS-REFERENCE TO RELATED APPLICATION

The present disclosure claims priority to U.S. Provisional Application No. 62/463,109 filed Feb. 24, 2017.

BACKGROUND

Hydraulic fracturing (also known as fracking) is a well-stimulation process that utilizes pressurized liquids to fracture rock formations. Pumps and other equipment used for hydraulic fracturing typically operate at the surface of the well site. The equipment may operate until refueling is needed, at which time the equipment may be shut-down for refueling. Shut-downs are costly and reduce efficiency. More preferably, to avoid shut-downs fuel is replenished in a hot-refueling operation while the equipment continues to run. This permits fracking operations to proceed continuously. However, hot-refueling can be difficult to reliably sustain for the duration of the fracking operation.

SUMMARY

A distribution station includes a mobile trailer, a pump, a manifold, a fluid line connecting the pump to the manifold, and a bypass line leading into the fluid line between the pump and the manifold. The bypass line permits fluid to be provided to the manifold without use of the pump. Reels on the mobile trailer are individually connected with the manifold, and hoses are connected with a different one of the reels. Valves on the mobile trailer are situated between the manifold and different ones of the reels. Fluid level sensors are connectable to the ends of different ones of the hoses. A controller is configured to individually open and close the valves responsive to the fluid level sensors.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 10 is divided into sub-sections, indicated as FIG. 10A, FIG. 10B, FIG. 10C, FIG. 10D, FIG. 10E, and FIG. 10F. The sub-sections show the details of the workflow logic diagram and, where appropriate, linking arrows to adjacent sub-sections. The relative location of the sub-sections to each other is also shown.

FIG. 11 is divided into sub-sections, indicated as FIG. 11A, FIG. 11B, FIG. 11C, FIG. 11D, FIG. 11E, FIG. 11F, FIG. 11G, and FIG. 11H. The sub-sections show the details of the workflow logic diagram and, where appropriate, linking arrows to adjacent sub-sections. The relative location of the sub-sections to each other is also shown

DETAILED DESCRIPTION

Figure 1:
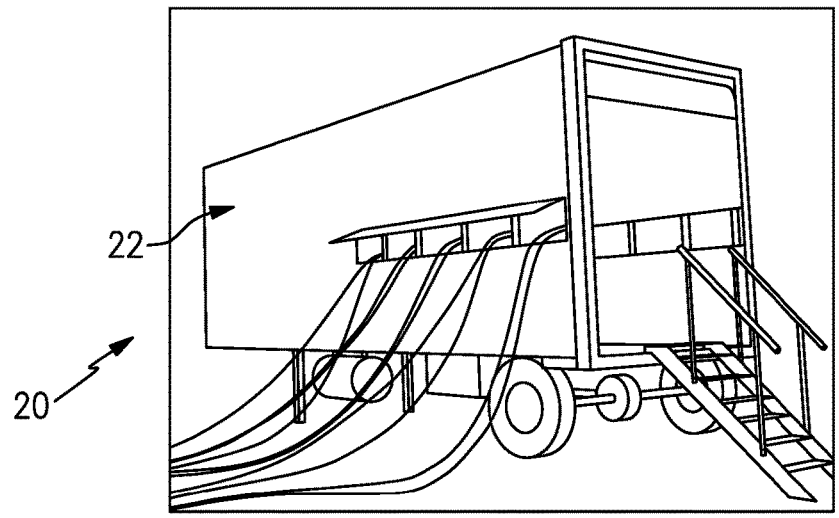
FIG. 1 illustrates an example mobile distribution station.
Figure 2A:
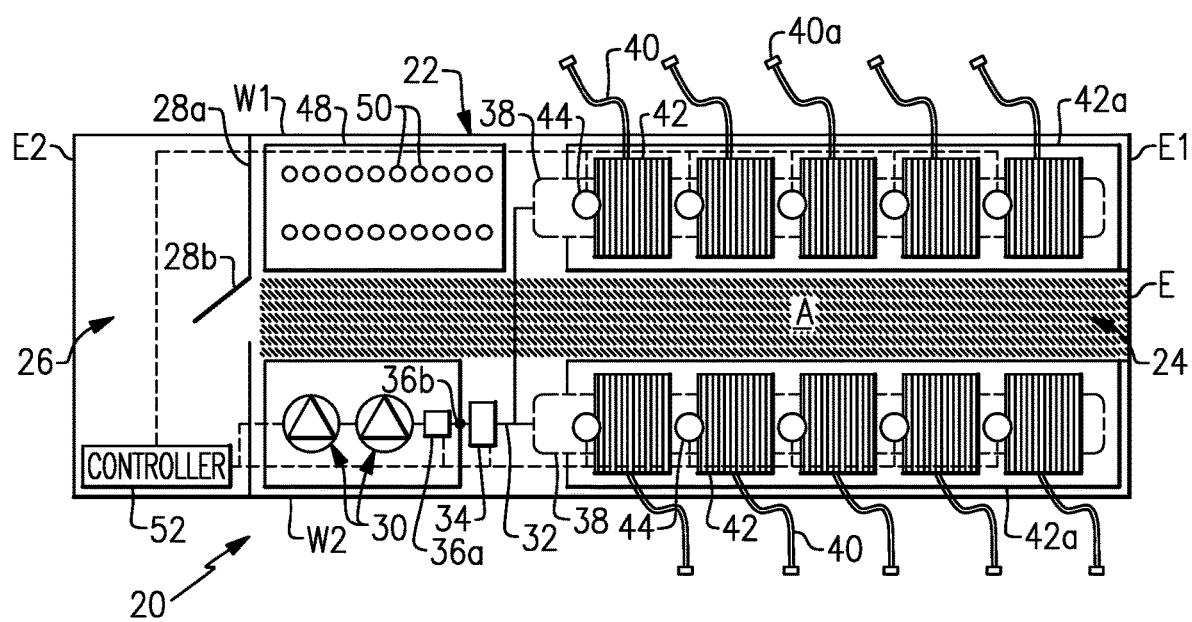
FIG. 2A illustrates an internal layout of a mobile distribution station.

FIG. 1 illustrates a mobile distribution station 20 and FIG. 2A illustrates an internal layout of the station 20. As will be described, the station 20 may serve in a "hot-refueling" capacity to distribute fuel to multiple pieces of equipment while the equipment is running, such as fracking equipment at a well site. As will be appreciated, the station 20 is not limited to applications for fracking or for delivering fuel. The examples herein may be presented with respect to fuel delivery, but the station 20 may be used in mobile delivery of other fluids, in other gas/petroleum recovery operations, or in other operations where mobile refueling or fluid delivery will be of benefit.

In this example, the station 20 includes a mobile trailer 22. Generally, the mobile trailer 22 is elongated and has first and second opposed trailer side walls W1 and W2 that join first and second opposed trailer end walls E1 and E2. Most typically, the trailer 22 will also have a closed top (not shown). The mobile trailer 22 may have wheels that permit the mobile trailer 22 to be moved by a vehicle from site to site to service different hot-refueling operations. In this example, the mobile trailer 22 has two compartments. A first compartment 24 includes the physical components for distributing fuel, such as diesel fuel, and a second compartment 26 serves as an isolated control room for managing and monitoring fuel distribution. The compartments 24/26 are separated by an inside wall 28a that has an inside door 28b.

The first compartment 24 includes one or more pumps 30. Fuel may be provided to the one or more pumps 30 from an external fuel source, such as a tanker truck on the site. On the trailer 22, the one or more pumps 30 are fluidly connected via a fuel line 32 with a high precision register 34 for metering fuel. The fuel line 32 may include, but is not limited to, hard piping. In this example, the fuel line 32 includes a filtration and air eliminator system 36a and one or more sensors 36b. Although optional, the system 36a is beneficial in many implementations, to remove foreign particles and air from the fuel prior to delivery to the equipment. The one or more sensors 36b may include a temperature sensor, a pressure sensor, or a combination thereof, which assist in fuel distribution management.

Figure 2B:
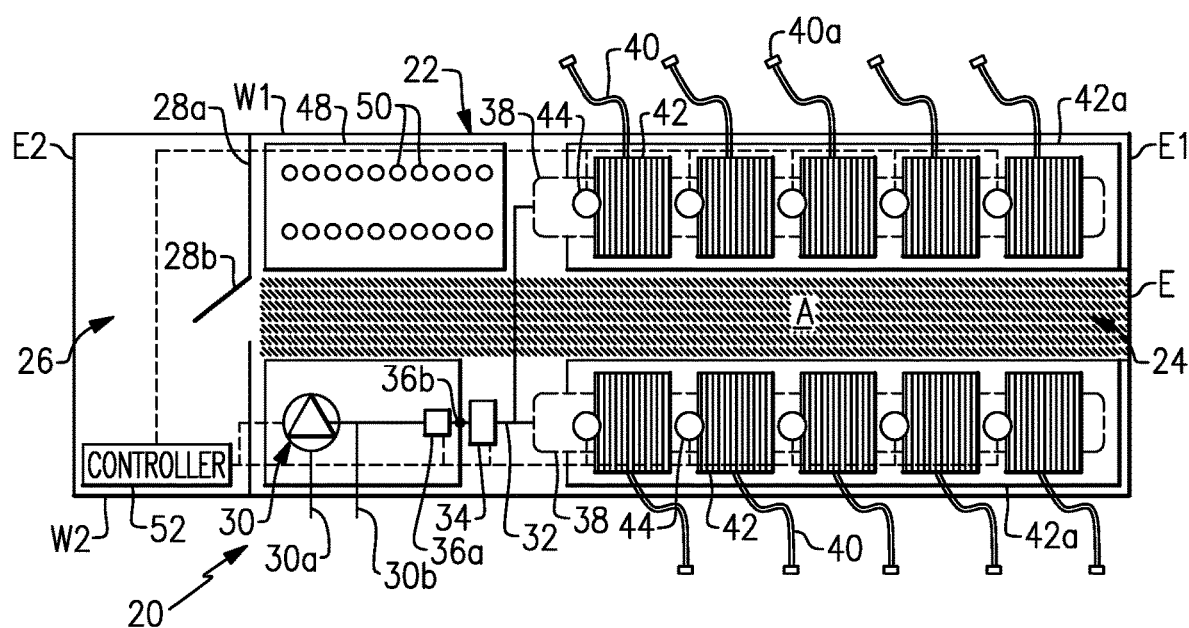
FIG. 2B illustrates a modified example of the mobile distribution station of FIG. 2A.

FIG. 2B illustrates a modified example of the station 20 of FIG. 2A. As mentioned above, fuel may be provided to the pumps 30 in FIG. 2A from an external fuel source. Similarly, in FIG. 2B, fuel may be provided from an external fuel source to the pump 30 via supply line 30a. That is, the outlet of the supply line 30a is directly connected to the inlet of the pump 30. In this example, the station includes an additional supply line, bypass line 30b, through which the fuel source may provide fuel into the station 20. For instance, if the pump 30 malfunctions or becomes inoperable, an auxiliary pump can be used to pump fuel into the station 20 via bypass line 30b. Thus, even if the pump 30 cannot pump fuel into the station 20, the station 20 can continue to operate. The bypass line 30b thus enhances reliability of the station 20 for distributing fuel to the equipment, thereby also avoiding the need for the equipment to be shut down if the pump 30 is unable to pump fuel.

The fuel line 32 is connected with one or more manifolds 38. In the illustrated example, the station 20 includes two manifolds 38 that are arranged on opposed sides of the compartment 24. As an example, the manifolds 38 are elongated tubes that are generally larger in diameter than the fuel line 32 and that have at least one inlet and multiple outlets. Each hose 40 is wound, at least initially, on a reel 42 that is rotatable to extend or retract the hose 40 externally through one or more windows of the trailer 22. Each reel 42 may have an associated motor to mechanically extend and retract the hose 40.

Figure 2C:
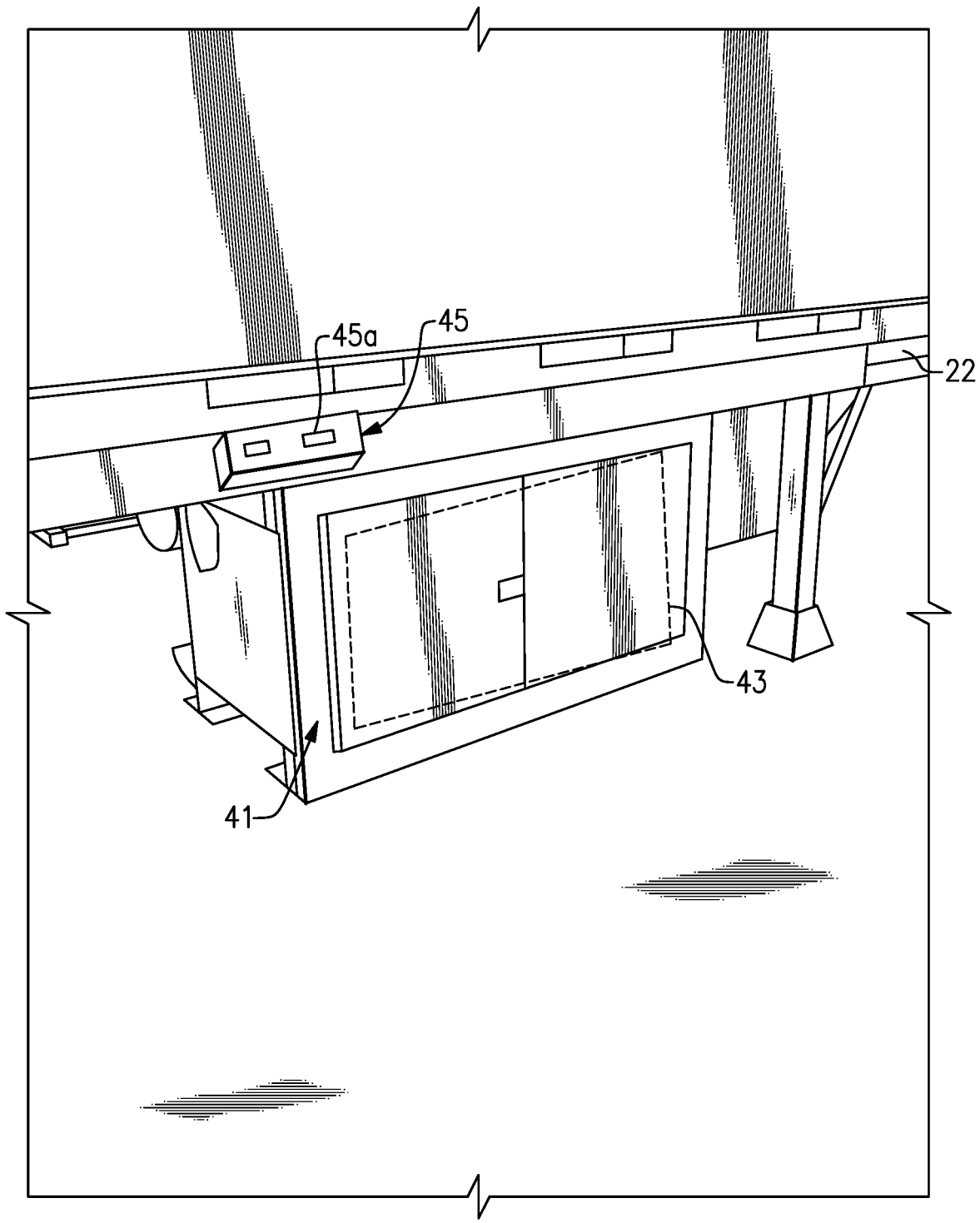
FIG. 2C illustrates a power scheme of a mobile distribution station that has an auxiliary generator connection port.

FIG. 2C illustrates an exterior underside area of the trailer 22 and an example power scheme of the station 20. Here, the trailer 22 carries a compartment 41 that houses a generator 43. The trailer 22 may also carry a fuel tank that is connected with the generator 43 to provide fuel to run the generator 43 and produce electrical power. The electrical power is used in the trailer 22 to run the pump or pumps 30, controller 52, control valves 44, and any other components that require electric power. For example, the generator 43 may be the sole source of electrical power of the station 20. As the sole source, if the generator 43 were to malfunction or become inoperable, the station 20 includes an auxiliary generator connection port 45 that is electrically connected with the pump or pumps 30, the controller 52, the control valves 44, and any other components that require electric power. The auxiliary generator connection port 45 is configured to electrically connect (e.g., as an inlet box, a plug, or the like) with an auxiliary generator, which may be kept on the trailer or provided separately.

If the generator 43 is unable to provide electric power, an auxiliary generator can be connected via the auxiliary generator connection port 45 to the station 20 to provide electrical power. In this regard, the auxiliary generator connection port 45 may include a transfer switch 45a or the like for switching electrical input from the generator 43 to the auxiliary generator. Thus, even if the generator 43 cannot power the station 20, the station 20 can continue to operate. The auxiliary generator connection port 45 thus enhances reliability of the station 20 for distributing fuel to the equipment, thereby also avoiding the need for the equipment to be shut down if the generator 43 is unable to provide power.

As shown, the auxiliary generator connection port 45 is outside of the compartment 41. This location enables an auxiliary generator to be rapidly connected to the station 20 without having to remove the generator 43 from the compartment or disassemble the generator 43 to enable connection of the auxiliary generator. Alternatively, the auxiliary generator connection port 45 may be inside of the compartment in a location that the generator 43 does not substantially hinder access to.

Figure 3:
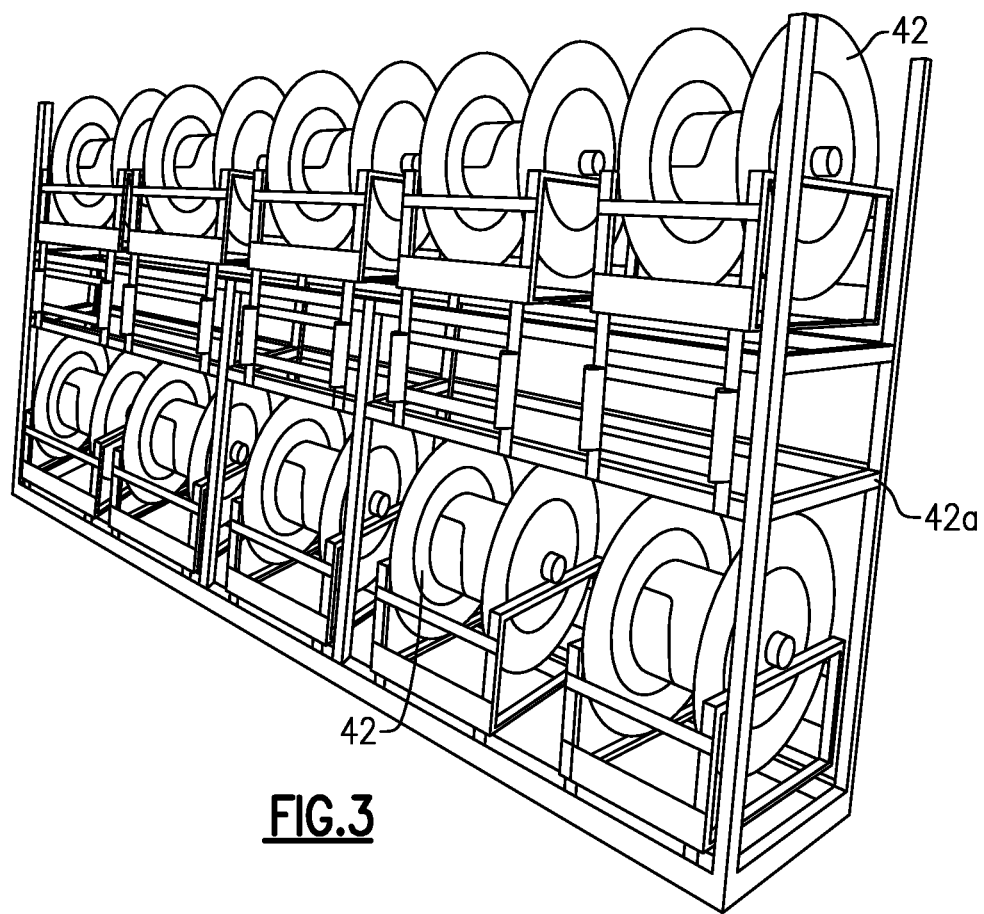
FIG. 3 illustrates an isolated view of hose reels on a support rack used in a mobile distribution station.

As shown in an isolated view in FIG. 3, the reels 42 are mounted on a support rack 42a. In this example, the support rack 42a is configured with upper and lower rows of reels 42. Each row has five reels 42 such that each support rack 42a provides ten reels 42 and thus ten hoses 40. There are two support racks 42a (FIG. 2A) arranged on opposed sides of the first compartment 24, with an aisle (A) that runs between the support racks 42a from an outside door E to the inside door 28b. The station 20 therefore provides twenty hoses 40 in the illustrated arrangement, with ten hoses 40 provided on each side of the station 20. As will be appreciated, fewer or additional reels and hoses may be used in alternative examples.

Figure 4A:
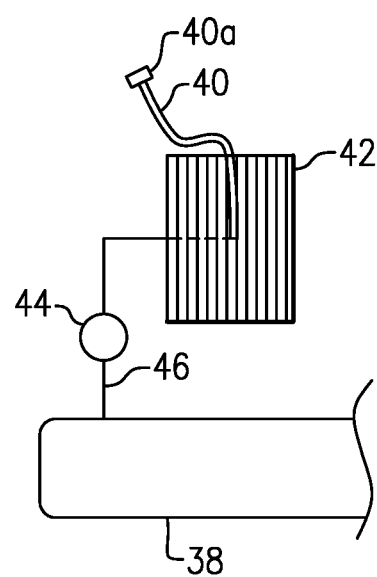
FIG. 4A illustrates an example of a connection between a manifold, a control valve, and a reel.

As shown in a representative example in FIG. 4A, each hose 40 is connected to a respective one of the reels 42 and a respective one of a plurality of control valves 44. For example, a secondary fuel line 46 leads from the manifold 38 to the reel 42. The control valve 44 is in the secondary fuel line 46. The control valve 44 is moveable between open and closed positions to selectively permit fuel flow from the manifold 38 to the reel 42 and the hose 40. For example, the control valve 44 is a powered valve, such as a solenoid valve.

Figure 4B:
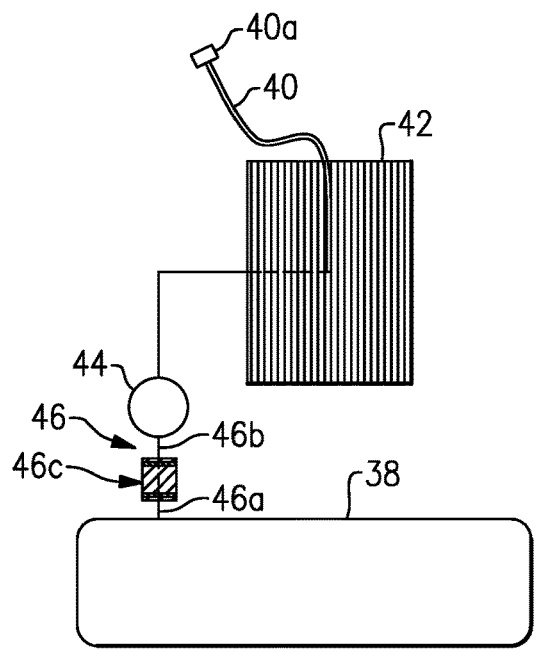
FIG. 4B illustrates a modified example of the connection in FIG. 4A.

FIG. 4B illustrates a modified example that is similar to FIG. 4A. In this example though, the secondary fuel line 46 of FIG. 4A includes a first section 46a and a second section 46b (e.g., pipe sections). In this example, the first section 46a is affixed with the manifold 38 and the second section 46b is affixed with the control valve 44. The sections 46a/46b are connected by a flexible coupling 46c. The flexible coupling 46c permits movement in the connection between the manifold and the reel 42. For example, the flexible coupling 46c permits movement between the manifold 38 and the downstream components including the control valve 44 and reel 42. For instance, the flexible coupling 46c may permit relative axial movement between the sections 46a/46b, relative bending movement between the sections 46a/46b, relative torsional movement between the sections 46a/46b, or combinations of these movements. The station 20 may thus benefit from the durability of hard piping (in comparison to rubber hose), while also mitigating vibrational effects.

In particular, at well sites there may be ground vibrations from the well equipment, such as the pumps at a fracking site. These vibrations may vary in magnitude and may occur continuously over several hours or days, or intermittently as isolated vibration events. The vibrations may be transmitted into the station 20 and may cause stress elevations and fatigue on the components and line or pipe connections in the station 20. In this regard, the flexible coupling 46c may be used to mitigate the effects of vibrations. For instance, vibrations may have potential to cause elevated stresses on a rigid connection between the manifold 38 and the reel 42. Use of the flexible coupling 46c in that location may thus reduce such stresses by permitting the movement between the sections 46a/46b. As will be appreciated, although the flexible coupling 46c in this example is located between the manifold 38 and the control valve 44, a flexible coupling 46c could additionally or alternatively be used in other rigid connections.

Figure 4C:
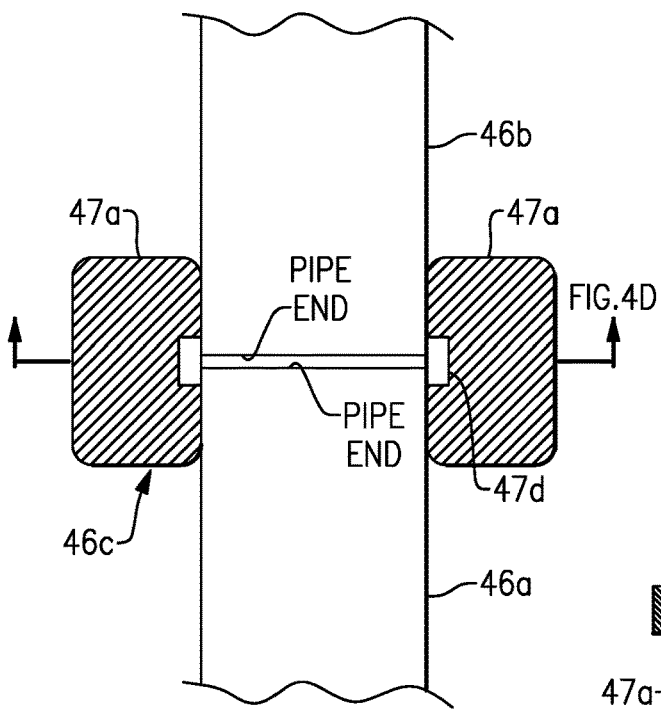
FIG. 4C illustrates a sectioned view of a flexible coupling.
Figure 4D:
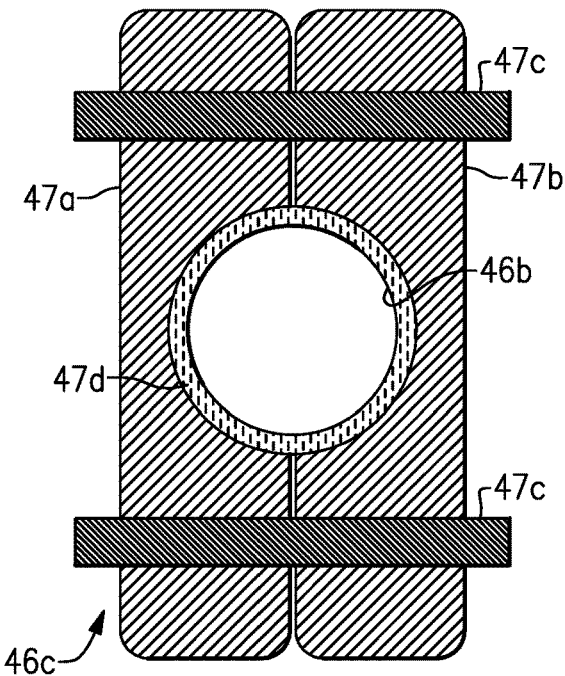
FIG. 4D illustrates another sectioned view of the flexible coupling of FIG. 4C.

FIGS. 4C and 4D illustrate sectioned views of an example of a flexible coupling 46c. In this example, the flexible coupling 46c is a clamp that includes first and second clamp members 47a and 47b that are secured together by one or more fasteners 47c, such as bolts. A gasket 47d is provided in the clamp around the ends of the sections 46a/46b to prevent escape of fuel at the coupling 46c. The gasket 47c seals the connection but permits movement of the ends of the sections 46a/46b, which may be spaced apart in the flexible coupling 46c to accommodate vibrational movement.

Figure 4E:
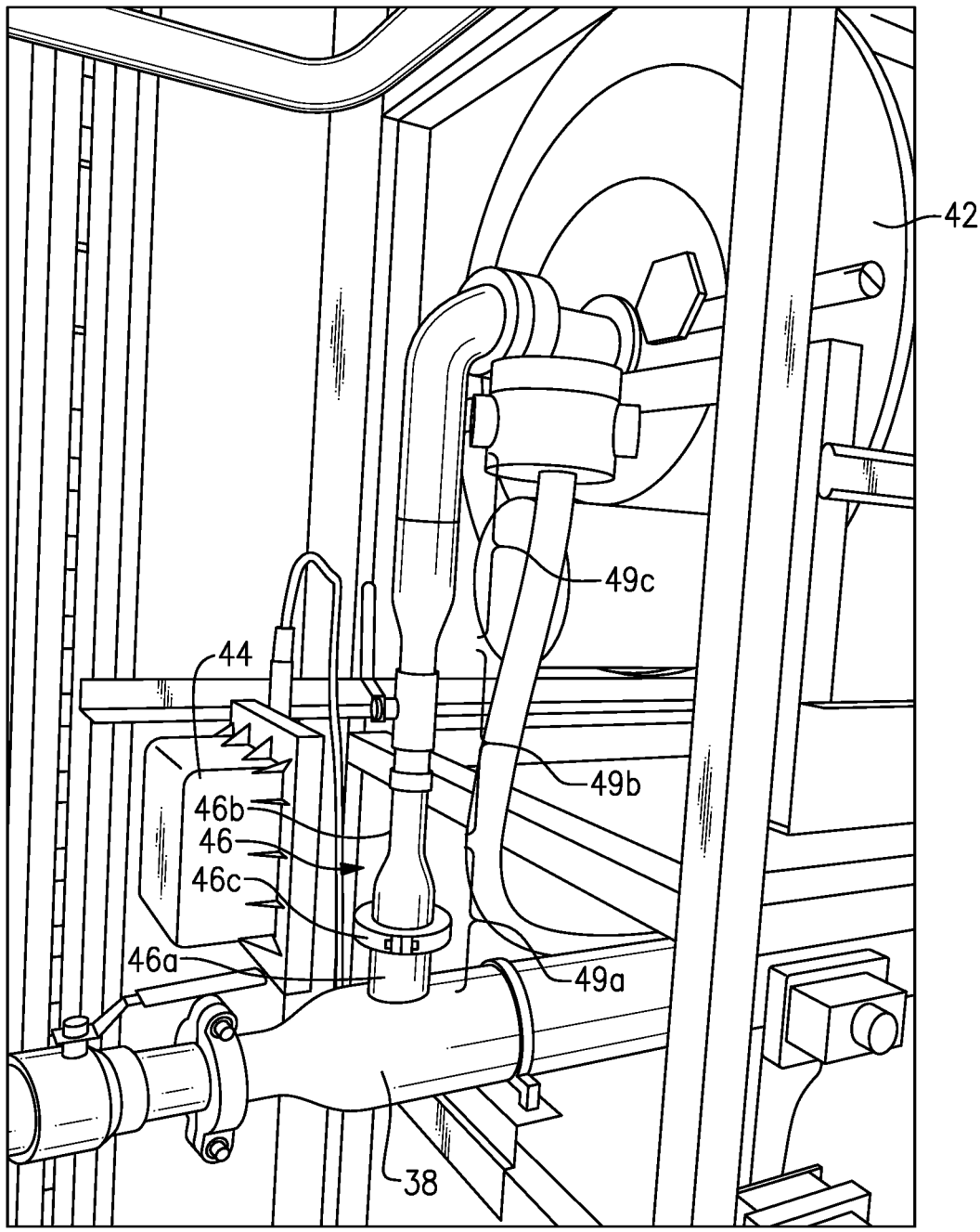
FIG. 4E illustrates a modified example of the connection in FIG. 4B.

FIG. 4E illustrates another modified example that is similar to FIG. 4B. In this example though, the secondary fuel line 46 defines a first diameter portion 49a, a second diameter portion 49b, and a third diameter portion 49c. The fuel is conveyed through these portions 49a/49b/49c. The first and third diameter portions 49a/49c have larger diameters than the second diameter portion 49b. In some examples, the diameters of the first and third diameter portions 49a/49b are equal, or are equal within 10%. In a further example, the diameter of the first and/or third diameter portions 49a/49b are larger than the diameter of the second diameter portion 49b by a factor of 1.1 to 2.

The portions 49a/49b/49c serve to facilitate supply of fuel to the reel 42 and hose 40. For instance, the relatively larger diameter of the first diameter portion 49a permits the fuel to readily flow from the manifold 38. The combination of the second diameter portion 49b and the third diameter portion 49c serves as a secondary manifold. For example, the relatively smaller diameter portion 49b restricts backpressure flow from the larger third diameter portion 49c and thus helps to retain a supply of fuel in the third diameter portion 49c to meet demand for flow into the reel 42 and corresponding hose 40. Thus, to the extent there is pressure delay in pumping the fuel out of the manifold 38, there is still a supply of fuel in the secondary manifold provided by the third diameter portion 49c.

Figure 4F:
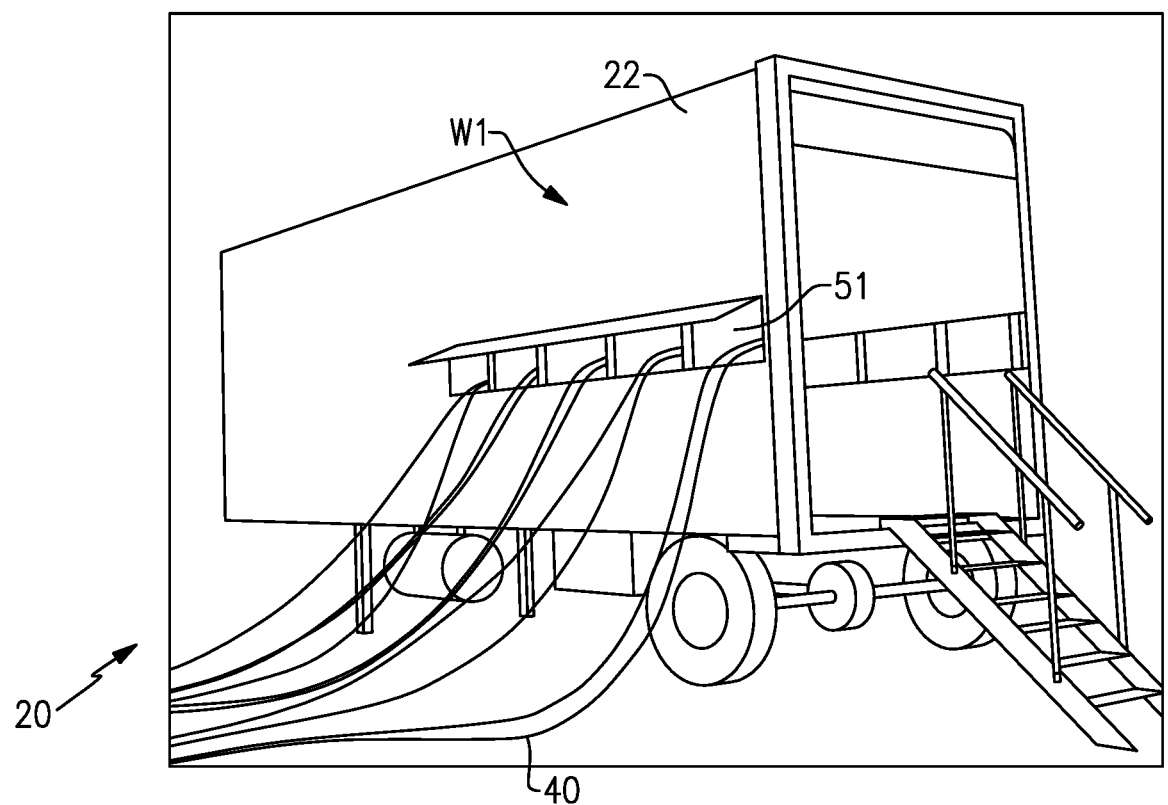
FIG. 4F illustrates a perspective view of the station of FIG. 1.

FIG. 4F illustrates a perspective view of the station 20. In this example, the hoses 40 are deployed through one or more windows 51 in the trailer 22. For instance, the trailer includes one or more windows 51 in each of the side walls W1 and W2 for deployment of the hoses 40 from both sides of the trailer 22. This enables the station 20 to more readily service equipment that may be located to each side of the station 20, thereby avoiding the need to route hoses 40 around the station 20 from one side to service equipment on the other side of the station 20.

Figure 4G:
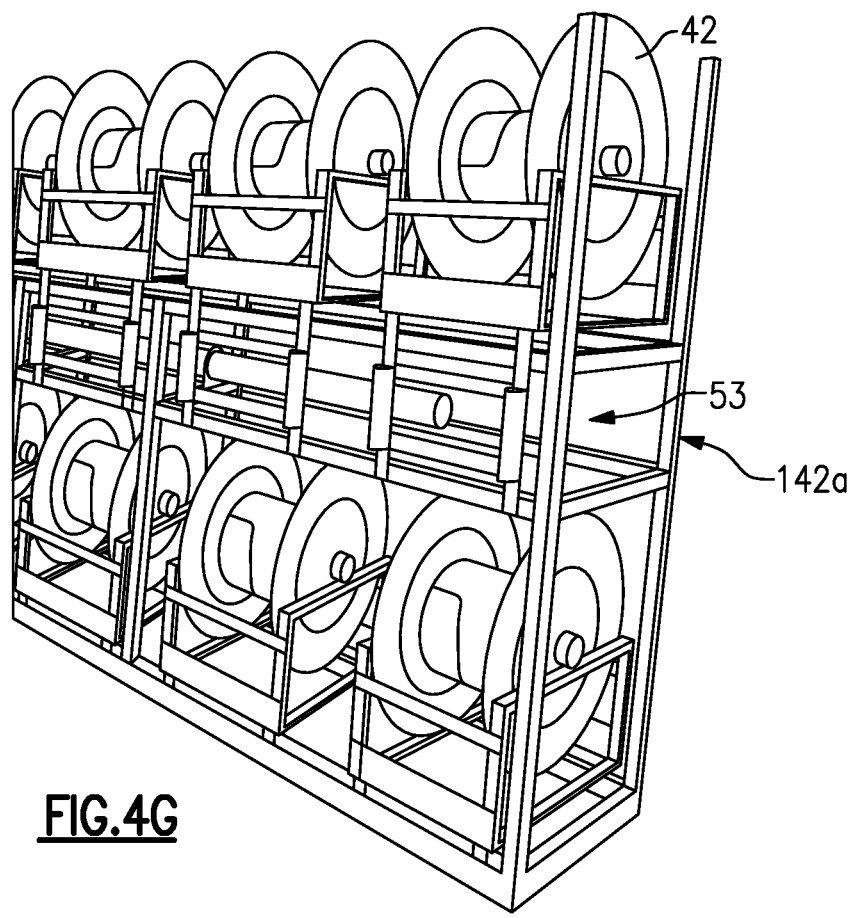
FIG. 4G illustrates reels of an example of a support rack.
Figure 4H:
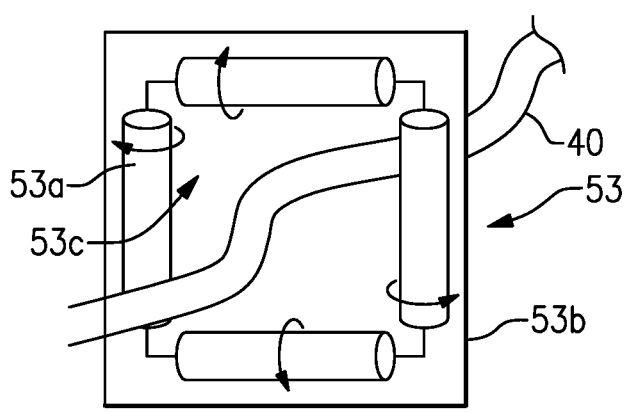
FIG. 4H illustrates an example hose guide of a station.

FIG. 4G illustrates the reels 42 on another example of a support rack 142a. The support rack 142a includes a plurality of hose guides 53 through which one or more hoses 40 are deployed. As shown also in a representative isolated view in FIG. 4H, each hose guide 53 includes at least one roller 53a. In this example, the hose guide 53 includes four rollers 53a. Each roller 53a is rotatably mounted on a frame section 53b of the support rack 142a. Here, the rollers 53a are arranged in a rectangular configuration to define an open guide window 53c there between. As will be appreciated, the roller 53a could be configured in other patterns to define differently shaped guide windows.

One or more hoses 40 are routed through each guide window 53c. In the example, one hose 40 is shown, but more typically at least two hoses 40 will be routed through a single guide window 53c. Most typically, these will be the hoses 40 from the reels 42 immediately above and below the given guide window 53. The hose guide 53 helps to keep the hose or hoses 40 aligned with the respective reels 42, as well as protecting the hoses 40 from coming into contact with other equipment that may damage or wear on the hoses 40.

The rollers 53 also facilitate easy deployment and retraction of the hoses 40 from the reels 42. For example, in addition to keeping the hoses 40 aligned (which also helps deployment/retraction), when one of the hoses 40 contacts one of the rollers 53a, the roller 53a can rotate as the hose 40 slides across the roller 53a during deployment/retraction. The rotation reduces friction on the hose 40 and thus reduces resistance to deployment/retraction. In one variation, rather than the rollers 53a, or as replacement for one or more of the rollers 53a, guide bars can be used. The guide bars may be rotationally fixed but can have curved or semi-circular surfaces that define the guide window and guide the hoses 40.

In the illustrated example, the first compartment 24 also includes a sensor support rack 48 (FIG. 2A). The sensor support rack 48 holds integrated fuel cap sensors 50 (when not in use), or at least portions thereof. When in use, each integrated fuel cap sensor 50 is temporarily affixed to a piece of equipment (i.e., the fuel tank of the equipment) that is subject to the hot-refueling operation. Each hose 40 may include a connector end 40a and each integrated fuel cap sensor 50 may have a corresponding mating connector to facilitate rapid connection and disconnection of the hose 40 with the integrated fuel cap sensor 50. For example, the connector end 40a and mating connector on the integrated fuel cap sensor 50 form a hydraulic quick-connect.

At least the control valves 44, pump or pumps 30, sensor or sensors 36b, and register 34 are in communication with a controller 52 located in the second compartment 26. As an example, the controller 52 includes software, hardware, or both that is configured to carry out any of the functions described herein. In one further example, the controller 52 includes a programmable logic controller with a touchscreen for user input and display of status data. For example, the screen may simultaneously show multiple fluid levels of the equipment that is being serviced.

When in operation, the integrated fuel cap sensors 50 are mounted on respective fuel tanks of the pieces of equipment that are subject to the hot-refueling operation. The hoses 40 are connected to the respective integrated fuel cap sensors 50. Each integrated fuel cap sensor 50 generates signals that are indicative of the fuel level in the fuel tank of the piece of equipment on which the integrated fuel cap sensor 50 is mounted. The signals are communicated to the controller 52.

The controller 52 interprets the signals and determines the fuel level for each fuel tank of each piece of equipment. In response to a fuel level that falls below a lower threshold, the controller 52 opens the control valve 44 associated with the hose 40 to that fuel tank and activates the pump or pumps 30. The pump or pumps 30 provide fuel flow into the manifolds 38 and through the open control valve 44 and reel 42 such that fuel is provided through the respective hose 40 and integrated fuel cap sensor 50 into the fuel tank. The lower threshold may correspond to an empty fuel level of the fuel tank, but more typically the lower threshold will be a level above the empty level to reduce the potential that the equipment completely runs out of fuel and shuts down. The controller 52 can also be programmed with a failsafe measure related to the operation of the fuel cap sensors 50. As an example, once a control valve 44 is open, if the controller 52 does not detect a change in fuel level from the fuel cap sensor 50 associated with the control valve 44 within a preset time period, the controller 52 shuts the pump 30 off and closes the control valve 44. Thus, if a hose 40 were to rupture, spillage of fuel is limited to the volume of fuel in the hose 40. For instance, the preset time period may be three seconds, six seconds, ten seconds, or fifteen seconds, which may limit spillage to approximately fifteen gallons for a given size of hose.

The controller 52 also determines when the fuel level in the fuel tank reaches an upper threshold. The upper threshold may correspond to a full fuel level of the fuel tank, but more typically the upper threshold will be a level below the full level to reduce the potential for overflow. In response to reaching the upper threshold, the controller 52 closes the respective control valve 44 and ceases the pump or pumps 30. If other control valves 44 are open or are to be opened, the pump or pumps 30 may remain on. The controller 52 can also be programmed with an electronic stop failsafe measure to prevent over-filling. As an example, once an upper threshold is reached on a first tank and the control valve 44 is closed, but the pump 30 is otherwise to remain on to fill other tanks, if the fuel level continues to rise in the first tank, the controller 52 shuts the pump 30 off.

Multiple control valves 44 may be open at one time, to provide fuel to multiple fuel tanks at one time. Alternatively, if there is demand for fuel from two or more fuel tanks, the controller 52 may sequentially open the control valves 44 such that the tanks are refueled sequentially. For instance, upon completion of refueling of one fuel tank, the controller 52 closes the control valve 44 of the hose 40 associated with that tank and then opens the next control valve 44 to begin refueling the next fuel tank. Sequential refueling may facilitate maintaining internal pressure in the manifold and fuel line 32 above a desired or preset pressure threshold to more rapidly deliver fuel. Similarly, the controller 52 may limit the number of control valves 44 that are open at any one instance in order to maintain the internal pressure in the manifold and fuel line 32 above a desired or preset threshold. The controller 52 may perform the functions above while in an automated operating mode. Additionally, the controller 52 may have a manual mode in which a user can control at least some functions through the PLC, such as starting and stopped the pump 30 and opening and closing control valves 44. For example, manual mode may be used at the beginning of a job when initially filling tanks to levels at which the fuel cap sensors 50 can detect fuel and/or during a job if a fuel cap sensor 50 becomes inoperable. Of course, operating in manual mode may deactivate some automated functions, such as filling at the low threshold or stopping at the high threshold.

In addition to the use of the sensor signals to determine fuel level, or even as an alternative to use of the sensor signals, the refueling may be time-based. For instance, the fuel consumption of a given piece of equipment may be known such that the fuel tank reaches the lower threshold at known time intervals. The controller 52 is operable to refuel the fuel tank at the time intervals rather than on the basis of the sensor signals, although sensor signals may also be used to verify fuel level.

The controller 52 also tracks the amount of fuel provided to the fuel tanks. For instance, the register 34 precisely measures the amount of fuel provided from the pump or pumps 30. As an example, the register 34 is an electronic register and has a resolution of about 0.1 gallons. The register 34 communicates measurement data to the controller 52. The controller 52 can thus determine the total amount of fuel used to very precise levels. The controller 52 may also be configured to provide outputs of the total amount of fuel consumed. For instance, a user may program the controller 52 to provide outputs at desired intervals, such as by worker shifts or daily, weekly, or monthly periods. The outputs may also be used to generate invoices for the amount of fuel used. As an example, the controller 52 may provide a daily output of fuel use and trigger the generation of an invoice that corresponds to the daily fuel use, thereby enabling almost instantaneous invoicing.

In a further example, the integrated fuel cap sensors 50 are each hard-wired to the controller 52. The term "hard-wired" or variations thereof refers to a wired connection between two components that serves for electronic communication there between, which here is a sensor and a controller. The hard-wiring may facilitate providing more reliable signals from the integrated fuel cap sensors 50. For instance, the many pieces of equipment, vehicles, workers, etc. at a site may communicate using wireless devices. The wireless signals may interfere with each other and, therefore, degrade communication reliability. Hard-wiring the integrated fuel cap sensors 50 to the controller 52 facilitates reduction in interference and thus enhances reliability.

In general, hard-wiring in a hot-refueling environment presents several challenges. For example, a site has many workers walking about and typically is located on rough terrain. Thus, as will be described below, each integrated fuel cap sensor 50 is hard-wired through the associated hose 40 to the controller 52.

Figure 5:
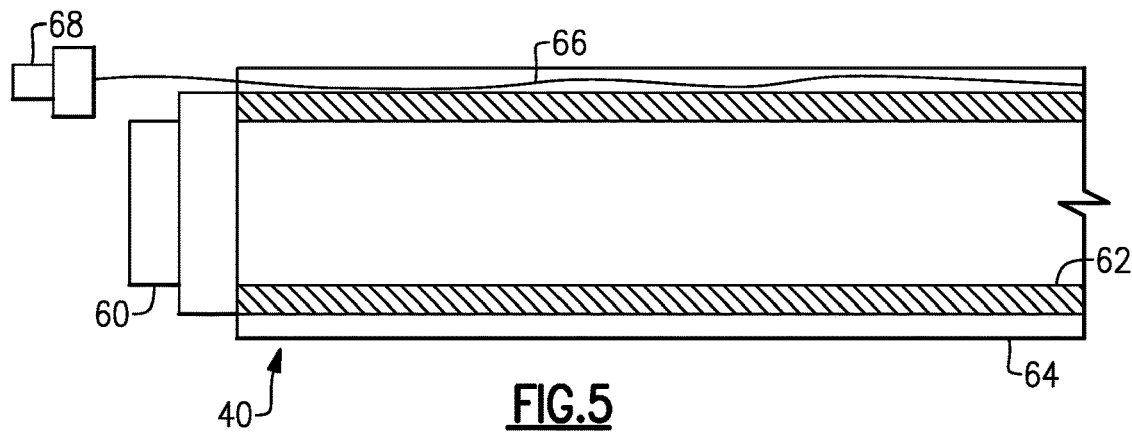
FIG. 5 illustrates a sectioned view of an example hose for a mobile distribution station.

FIG. 5 illustrates a representative portion of one of the hoses 40 and, specifically, the end of the hose 40 that will be located at the fuel tank of the equipment being refueled. In this example, the hose 40 includes a connector 60 at the end for detachably connecting the hose 40 to the integrated fuel cap sensors 50. The hose 40 is formed of a tube 62 and a sleeve 64 that circumscribes the tube 62. As an example, the tube 62 may be a flexible elastomeric tube and the sleeve 64 may be a flexible fabric sleeve. The sleeve 64 is generally loosely arranged around the tube 62, although the sleeve 64 may closely fit on the tube 62 to prevent substantial slipping of the sleeve 64 relative to the tube 62 during use and handling. Optionally, to further prevent slipping and/or to secure the sleeve 64, bands may be tightened around the hose 40. As an example, one or more steel or stainless steel bands can be provided at least near the ends of the hose 40.

A plurality of sensor communication lines 66 (one shown) are routed with or in the respective hoses 40. For instance, each line 66 may include a wire, a wire bundle, and/or multiple wires or wire bundles. In one further example, the line 66 is a low milli-amp intrinsic safety wiring, which serves as a protection feature for reducing the concern for operating electrical equipment in the presence of fuel by limiting the amount of thermal and electrical energy available for ignition. In this example, the line 66 is routed through the hose 40 between (radially) the tube 62 and the sleeve 64. The sleeve 64 thus serves to secure and protect the line 66, and the sleeve 64 may limit spill and spewing if there is a hose 40 rupture. In particular, since the line 66 is secured in the hose 40, the line 66 does not present a tripping concern for workers. Moreover, in rough terrain environments where there are stones, sand, and other objects that could damage the line 66 if it were free, the sleeve 64 shields the line 66 from direct contact with such objects. In further examples, the line 66 may be embedded or partially embedded in the tube 62 or the sleeve 64.

Figure 6:
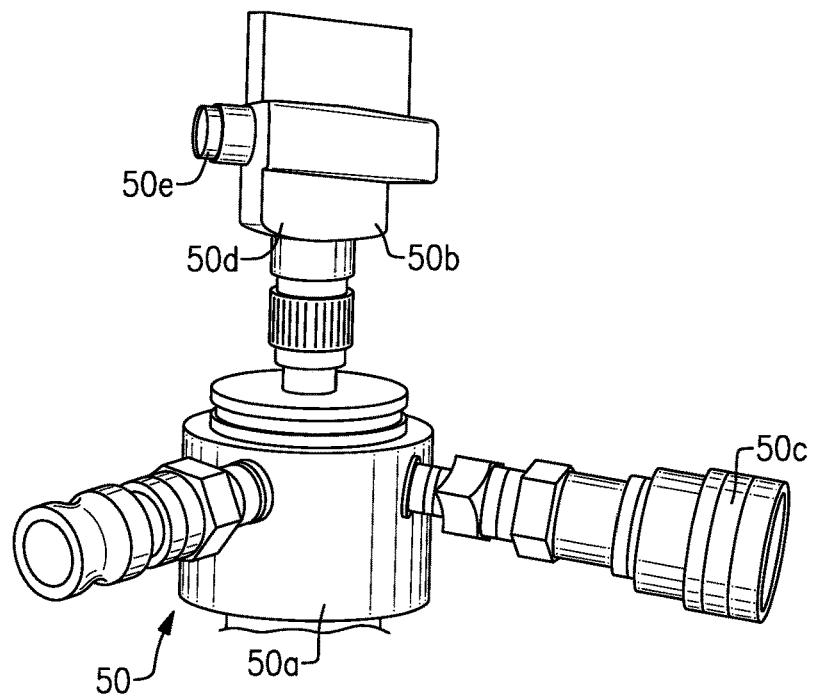
FIG. 6 illustrates an example of an integrated cap sensor for a mobile distribution station.

In this example, the line 66 extends out from the end of the hose 40 and includes a connector 68 that is detachably connectable with a respective one of the integrated fuel cap sensors 50. For example, FIG. 6 illustrates a representative example of one of the integrated fuel cap sensors 50. The integrated fuel cap sensor 50 includes a cap portion 50a and a level sensor portion 50b. The cap portion 50a is detachably connectable with a port of a fuel tank. The cap portion 50a includes a connector port 50c, which is detachably connectable with the connector 60 of the hose 40. The sensor portion 50b includes a sensor 50d and a sensor port 50e that is detachably connectable with the connector 68 of the line 66. The fuel cap sensor 50 may also include a vent port that attaches to a drain hose, to drain any overflow into a containment bucket and/or reduce air pressure build-up in a fuel tank. Thus, a user may first mount the cap portion 50a on the fuel tank of the equipment, followed by connecting the hose 40 to the port 50c and connecting the line 66 to the port 50e.

The sensor 50d may be any type of sensor that is capable of detecting fluid or fuel level in a tank. In one example, the sensor 50d is a guided wave radar sensor. A guided wave radar sensor may include a transmitter/sensor that emits radar waves, most typically radio frequency waves, down a probe. A sheath may be provided around the probe. For example, the sheath may be a metal alloy (e.g., stainless steel or aluminum) or polymer tube that surrounds the probe. One or more bushings may be provided between the probe and the sheath, to separate the probe from the sheath. The sheath shields the probe from contact by external objects, the walls of a fuel tank, or other components in a fuel tank, which might otherwise increase the potential for faulty sensor readings. The probe serves as a guide for the radar waves. The radar waves reflect off of the surface of the fuel and the reflected radar waves are received into the transmitter/sensor. A sensor controller determines the "time of flight" of the radar waves, i.e., how long it takes from emission of the radar waves for the radar waves to reflect back to the transmitter/sensor. Based on the time, the sensor controller, or the controller 52 if the sensor controller does not have the capability, determines the distance that the radar waves travel. A longer distance thus indicates a lower fuel level (farther away) and a shorter distance indicates a higher fuel level (closer).

Figure 7:
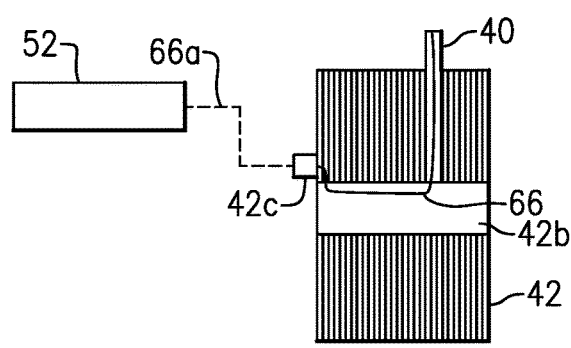
FIG. 7 illustrates an example of the routing of a sensor communication line through a reel in a mobile distribution station.

The line 66 routes through the hose 40 and back to the reel 42 in the trailer 22. For example, the line 66 is also routed or hard-wired through the reel 42 to the controller 52. FIG. 7 illustrates a representative example of the routing in the reel 42. In this example, the reel 42 includes a spindle 42b about which the reel is rotatable. The spindle 42b may be hollow, and the line 66 may be routed through the spindle 42b. The reel 42 may also include a connector 42c mounted thereon. The connector 42c receives the line 66 and serves as a port for connection with another line 66a to the controller 52.

The lines 66a may converge to one or more communication junction blocks or "bricks" prior to the controller 52. The communication junction blocks may serve to facilitate the relay of the signals back to the controller 52. The communication junction blocks may alternatively or additionally serve to facilitate identification of the lines 66, and thus the signals, with respect to which of the hoses a particular line 66 is associated with. For instance, a group of communication junction blocks may have unique identifiers and the lines 66 into a particular communication junction block may be associated with identifiers. A signal relayed into the controller 52 may thus be associated with the identifiers of the communication junction blocks and a particular line 66 of that communication junction block in order to identify which hose 40 the signal is to be associated with. The valves 44 may also communicate with the controller 52 in a similar manner through the communication junction blocks.

As can be appreciated from the examples herein, the station 20 permits continuous hot-refueling with enhanced reliability. While there might generally be a tendency to choose wireless sensor communication for convenience, a hard-wired approach mitigates the potential for signal interference that can arise with wireless. Moreover, by hard-wiring the sensors through the hoses to the controller, wired communication lines are protected from exposure and do not pose additional concerns for workers on a site.

Prior to use of the hose 40s in the station 20, the tubes 62, sleeves 64, and lines 66 may be assembled to form the hoses 40. In general, the line 66 is threaded through the interior of the sleeve 64, and the sleeve 64 and line 66 are then pulled over the tube 62, with the line 66 between the sleeve 64 and tube 62. In pulling the sleeve 64 over the tube 62, the sleeve 62 slides along the tube 62. Due to friction between the sleeve 64 and the tube 62, there may be considerable difficulty in pulling the sleeve 64 over the tube 62. In particular, over the long length of the hose 40 (e.g., 50 ft, 100 ft, 200 ft) used in the station 20, manually pulling the sleeve 64 over the tube 62 is nearly unmanageable, and at best manual pulling is tedious and time consuming.

Figure 8:
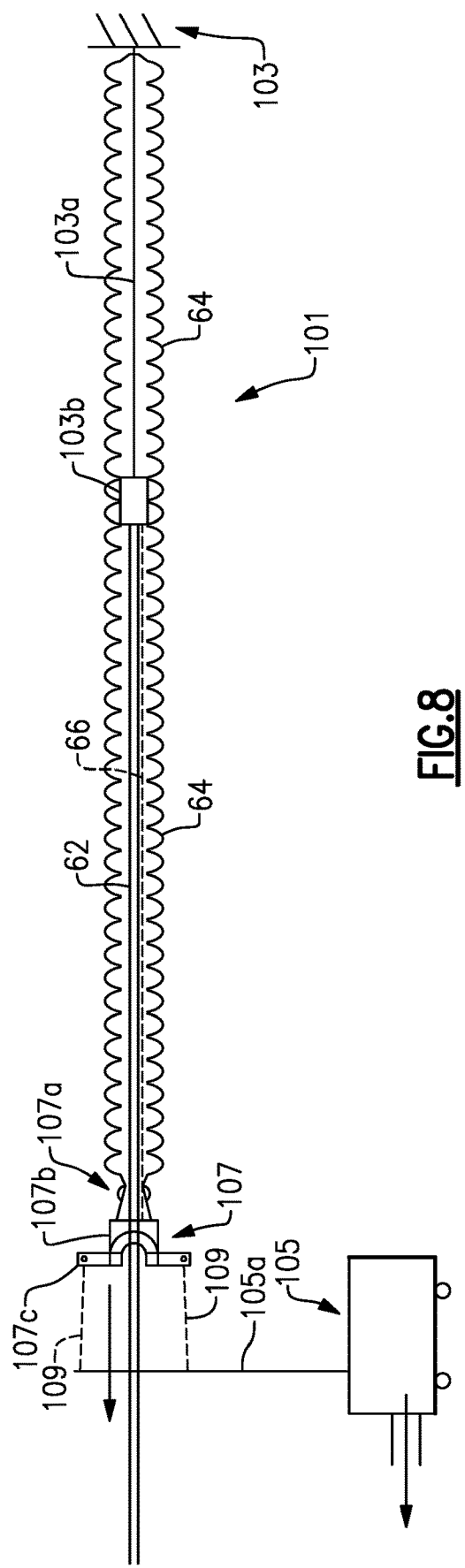
FIG. 8 illustrates an example system and method for pulling a sleeve and sensor communication line over a tube to form a hose.

FIG. 8 schematically depicts a system and method 101 for pulling the sleeve 64 over the tube 62 with the line 66 between the sleeve 64 and the tube 62. As shown, there is an anchor 103, a puller 105, and a fixture 107. Initially, the line 66 is threaded through the sleeve 64, and the sleeve 64 and line are bunched near the anchor 103. For instance, the anchor 103 may include an elongated rod 103a attached to a collar 103b. The end of the tube 62 is attached to the collar 103b (e.g., by threaded connection), and the sleeve 64 (and optionally line 66) are bunched on or mainly on the rod 103a. The collar 103a is sized such that the sleeve 64 can be pulled over the collar 103.

Most typically, the anchor 103 is a static structure that can bear the forces of pulling without breaking. In some examples, the anchor 103 is a parked vehicle, although the anchor 103 could alternatively be a fixed structure that is capable of bearing the pulling forces. In additional examples, the tube 62, sleeve 64, and line 66 may be removably mechanically secured to the anchor 103 by tying, clamping, binding, fastening, or the like.

The opposed ends of the sleeve 64 and line 66 engage with the fixture 107. For example, the fixture 107 includes a receiver 107a that is configured to secure the sleeve 64 with the fixture 107, and a receiver 107b that is configured to secure the line 66 with the fixture 107. The receivers 107a/107b may in some example be the same receiver that is capable of holding both of the sleeve 64 and the line 66. Although not limited, as an example, the receiver 107a includes a hose nipple piece that has an attachment end (e.g., threaded, flanged, etc.) for securement into the fixture 107 and a nipple end (e.g., grooved, serrated, barbed, etc.) for receiving the tube 62. A clamp may be used around the nipple end to further secure the tube 62 with the receiver 107a. The line 66 may be secured by the clamp or secured separately to a wire holder, such as another clamp, fastener, clip, tie down, or the like.

The fixture 107 also includes one or more ears 107c by which the fixture 107 can be pulled. In this example, the fixture 107 includes two such ears 107c. Each such ear 107c is configured to attach to a puller line 109. For example, either the puller line 109 or the ear 107c has a fastener and the other of the puller line 109 or ear 107c has a fastener receiver that is securable with the fastener. The fastener may be, but is not limited to, a hook, such as a snap bolt hook, a spring hook, a trigger snap hook, or the like. The fastener receiver may be an opening or ring that is sized to lock with the fastener.

The puller line or lines 109 are secured at their opposed ends to the puller 105. For example, the puller 105 may be a forklift with an extension arm 105a that attaches to the puller lines 109. The puller 105 is moveable to apply a pull force on the fixture 107 via the puller line or lines 109. The puller 105 pulls the fixture 107 (to the left in FIG. 8), and with it the sleeve 64 and line 66. Since the far end of the tube 62 is secured to the anchor 103 via the collar 103b and rod 103a, the pull force draws the sleeve 64 and line 66 over the tube 62 (i.e., the tube 62 is in the sleeve 74). As the sleeve 64 and line 66 are pulled, the bunched portion of the sleeve 64 that is on the rod 103a and the line 66 are drawn out over the tube 62. In one example, the tube 62, sleeve 64, and line 66 can be approximately equal in length such that once all of the bunched portion of the sleeve 64 and line 66 are drawn over the tube 62, the assembly process is substantially complete. If necessary, the tube 62, sleeve 64, and/or line 66 may be trimmed to a desired length after the process, to provide an even end for receiving a hose fitting, for example.

The examples above provide a mechanized system and method for more easily pulling the sleeve 64 and line 66 over the tube 62. The hose 40 can thus be assembled rapidly, which may greatly reduce lead time for producing new or replacement hoses 40 for the station 20.

Figure 9:
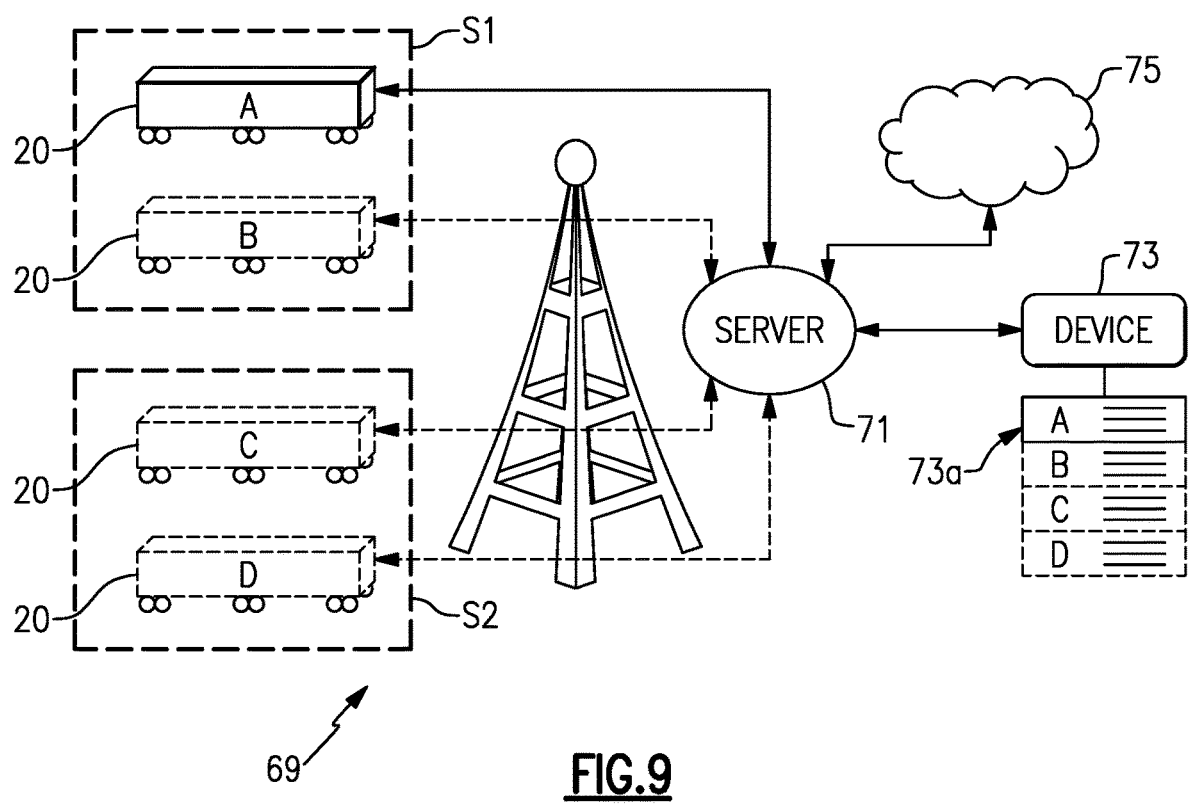
FIG. 9 illustrates a system that can be used to remotely monitor and manage one or more mobile distribution stations.

FIG. 9 illustrates a system 69 for remotely monitoring and/or managing at least one mobile distribution station 20 (A). It is to be appreciated that the system 69 may include additional mobile distribution stations, shown in phantom at 20 (B), 20 (C), and 20 (D) (collectively mobile distribution stations 20), for example. The mobile distribution stations 20 may be located at a single work site or located across several different work sites S1 and S2. Each mobile distribution station 20 is in communication with one or more servers 71 that are remotely located from the mobile distribution stations 20 and work sites S1/S2. In most implementations, the communication will be wireless.

The server 71 may include hardware, software, or both that is configured to perform the functions described herein. The server 71 may also be in communication with one or more electronic devices 73. The electronic device 73 is external of or remote from the mobile fuel distribution stations 20. For example, the electronic device 73 may be, but is not limited to, a computer, such as a desktop or laptop computer, a cellular device, or tablet device. The electronic device 73 may communicate and interact in the system 69 via data connectivity, which may involve internet connectivity, cellular connectivity, software, mobile application, or combinations of these.

The electronic device 73 may include a display 73a, such as an electronic screen, that is configured to display the fuel operating parameter data of each of the mobile distribution stations 20. As an example, the electronic device 73 may display in real-time the operating parameter data of each of the mobile distribution stations 20 in the system 69 to permit remote monitoring and management control of the mobile distribution stations 20. For instance, the operating parameter data may include fuel temperature, fuel pressure, fuel flow, total amount of fuel distributed, operational settings (e.g., low and high fuel level thresholds), or other parameters.

The server 71 may also be in communication with one or more cloud-based devices 75. The cloud-based device 75 may include one or more servers and a memory for communicating with and storing information from the server 71.

The server 71 is configured to communicate with the mobile distribution stations 20. Most typically, the server 71 will communicate with the controller 52 of the mobile distribution station 20. In this regard, the controller 52 of each mobile distribution station 20 may be include hardware, software, or both that is configured for external communication with the server 71. For example, each controller 52 may communicate and interact in the system 69 via data connectivity, which may involve internet connectivity, cellular connectivity, software, mobile application, or combinations of these.

The server 71 is configured to receive operating parameter data from the mobile distribution stations 20. The operating parameter data may include or represent physical measurements of operating conditions of the mobile distribution station 20, status information of the mobile distribution station 20, setting information of the mobile distribution station 20, or other information associated with control or management of the operation of the mobile distribution station 20.

For example, the server 71 utilizes the information to monitor and auto-manage the mobile distribution station 20. The monitoring and auto-management may be for purposes of identifying potential risk conditions that may require shutdown or alert, purposes of intelligently enhancing operation, or purposes of reading fuel or fluid levels in real-time via the sensors 50. As an example, the server 71 may utilize the information to monitor or display fuel or fluid levels, or determine whether the fuel operating parameter data is within a preset limit and send a control action in response to the operating parameter data being outside the preset limit. As will described in further detail below, the control action may be a shutdown instruction to the mobile fuel distribution stations 20, an adjustment instruction to the mobile fuel distribution stations 20, or an alert to the electronic device 73.

Figure 10A:
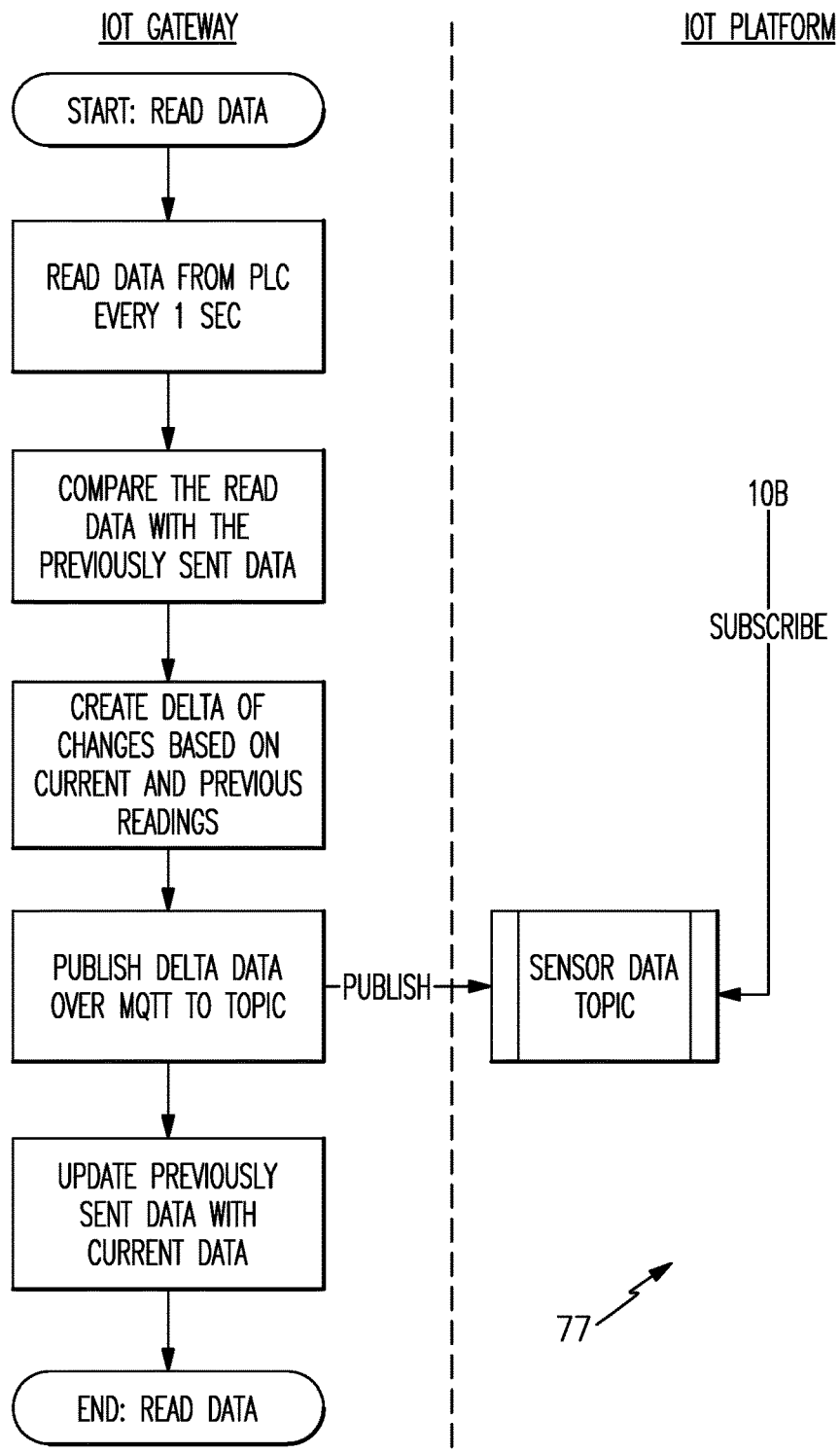
FIG. 10 is a workflow logic diagram that represents an example of a method for managing one or more mobile distribution stations. The size of the diagram exceeds what can be shown on a page. Therefore.
Figure 10:
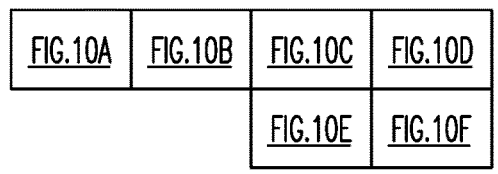
Figure 10B:
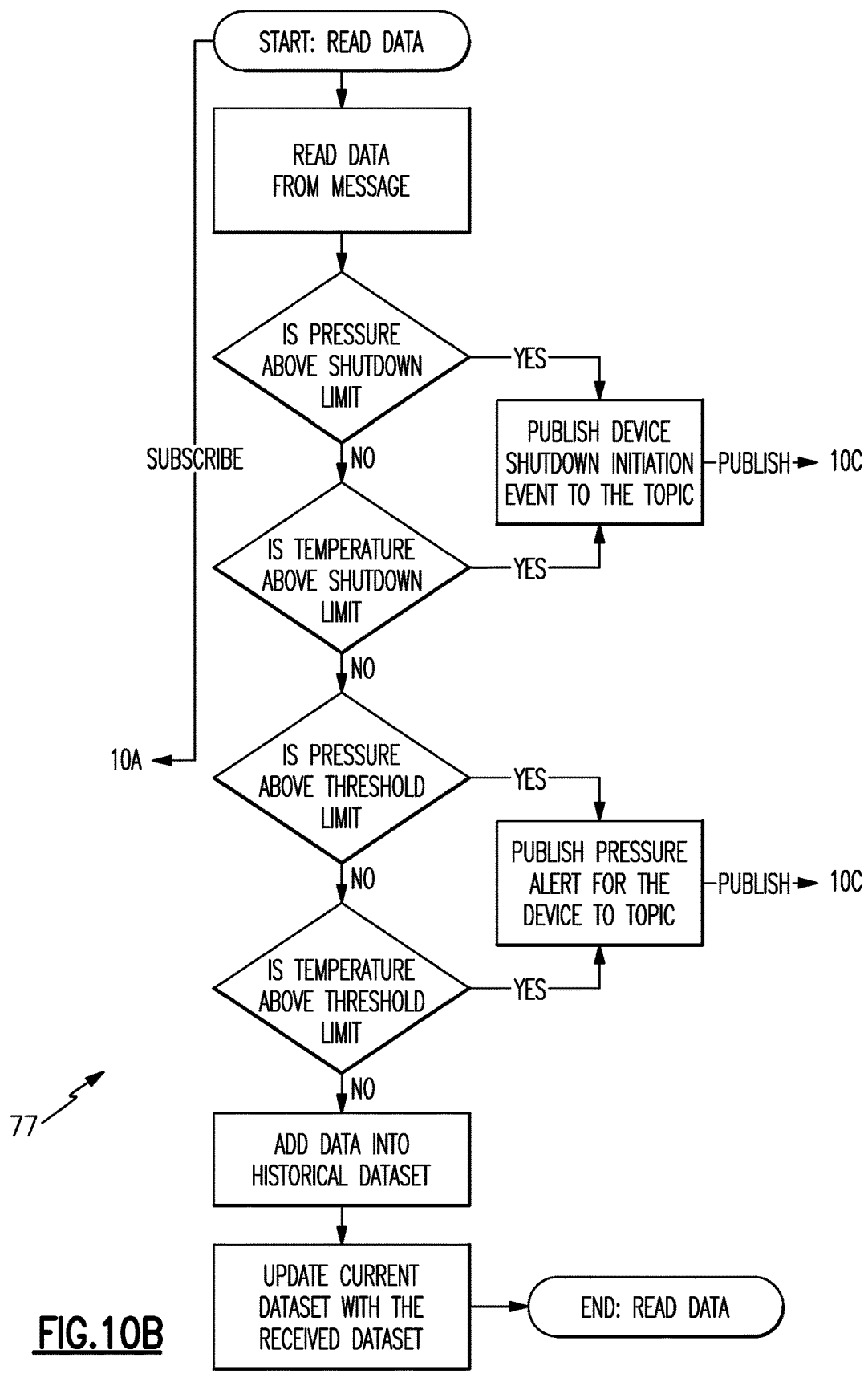
Figure 10C:
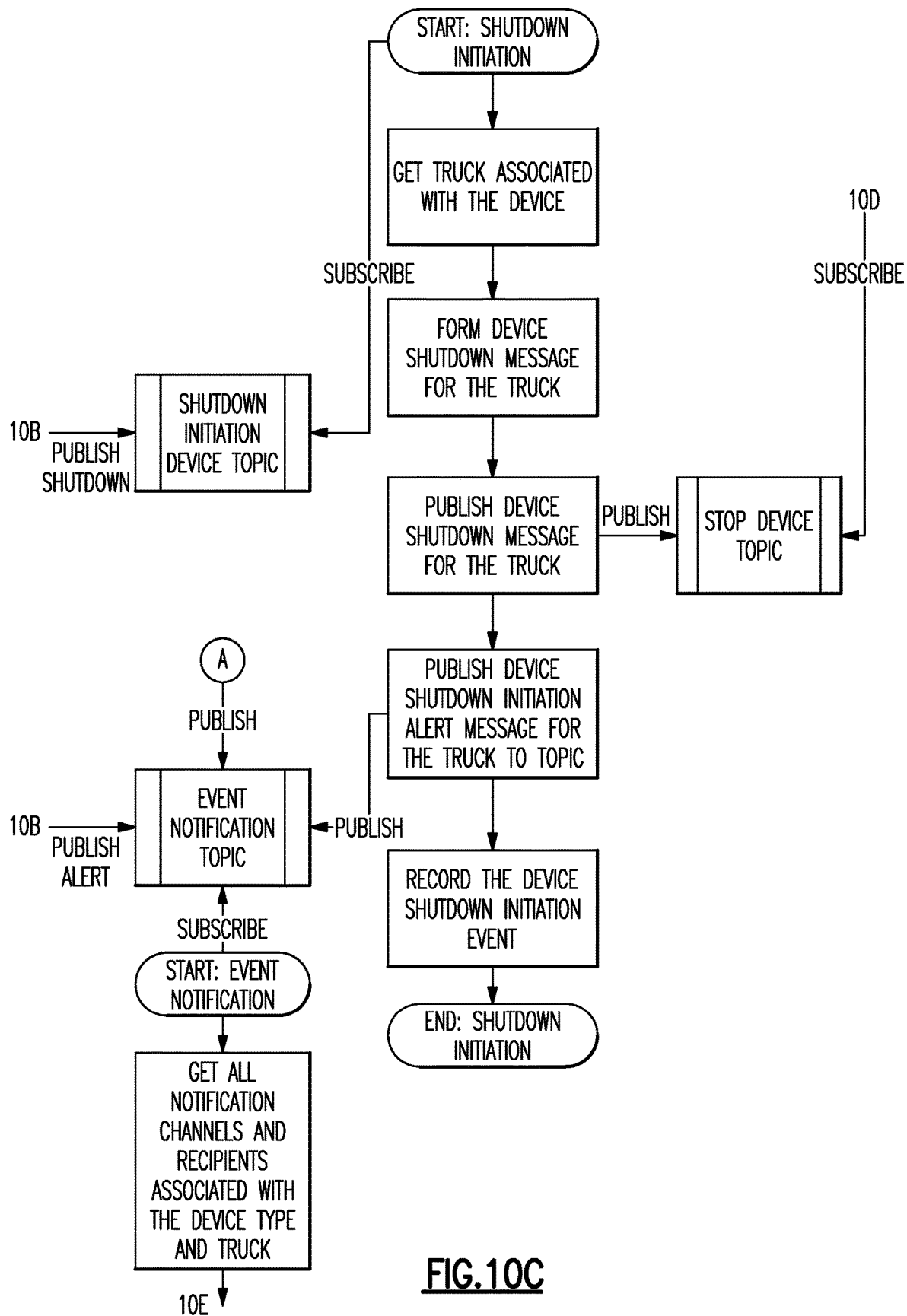
Figure 10D:
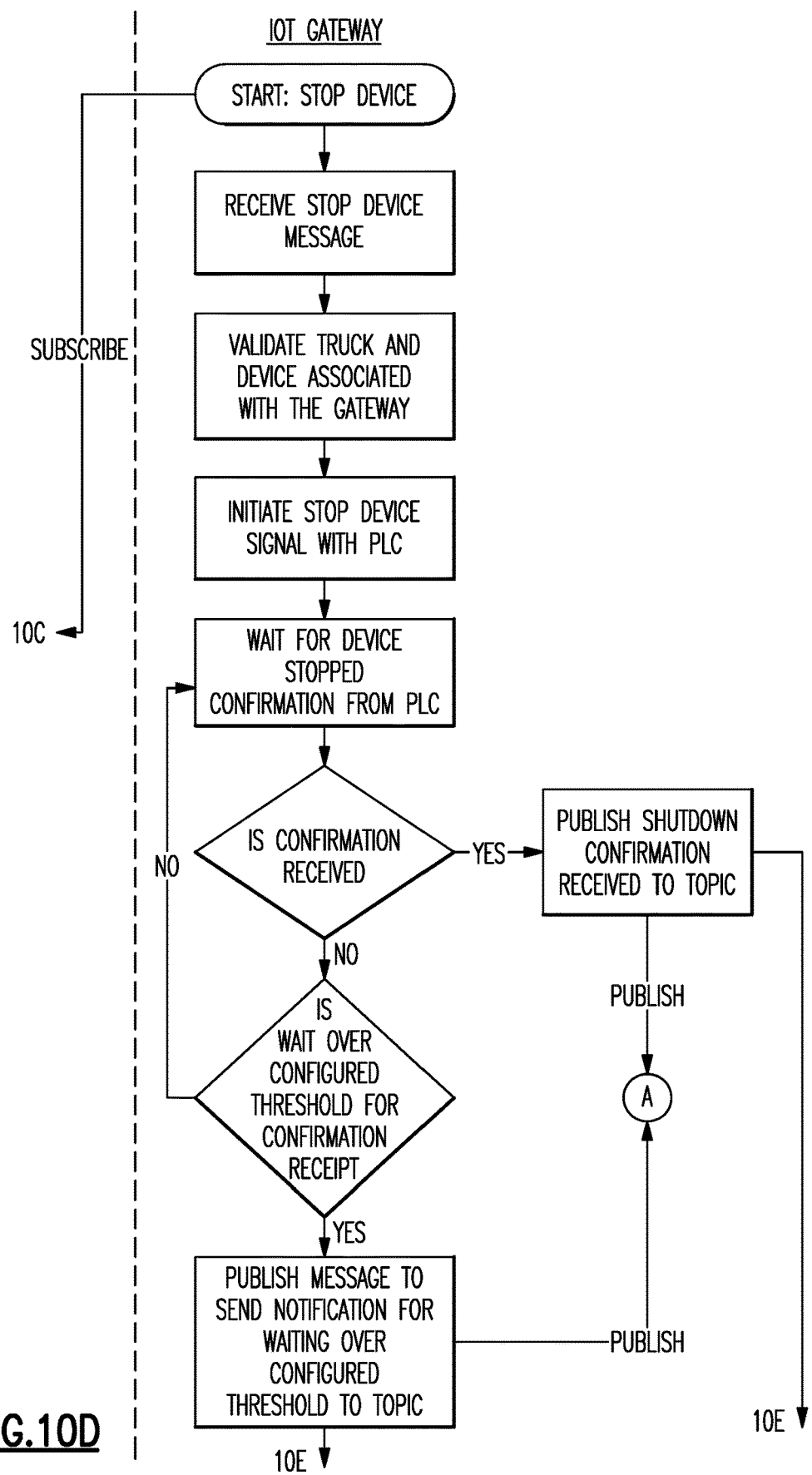
Figure 10E:
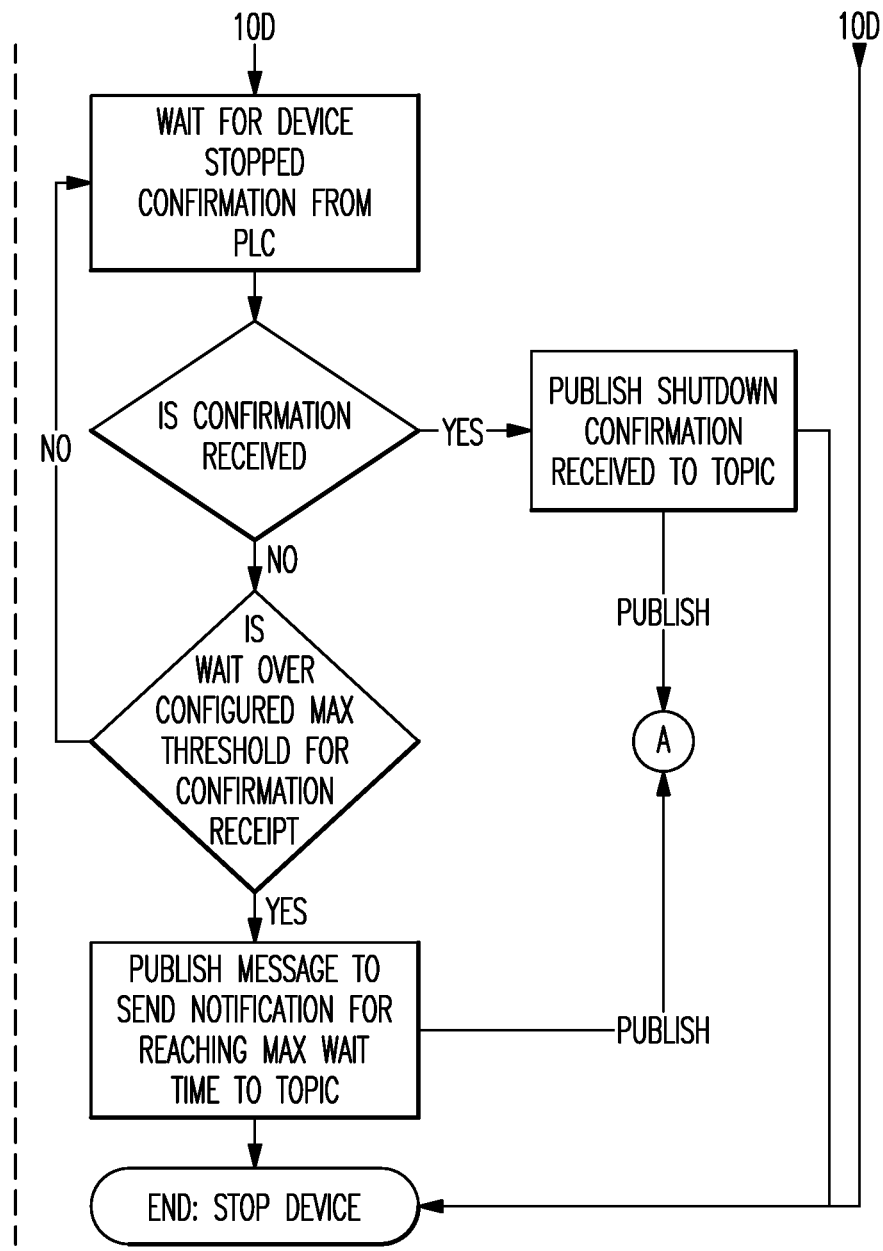
Figure 10F:
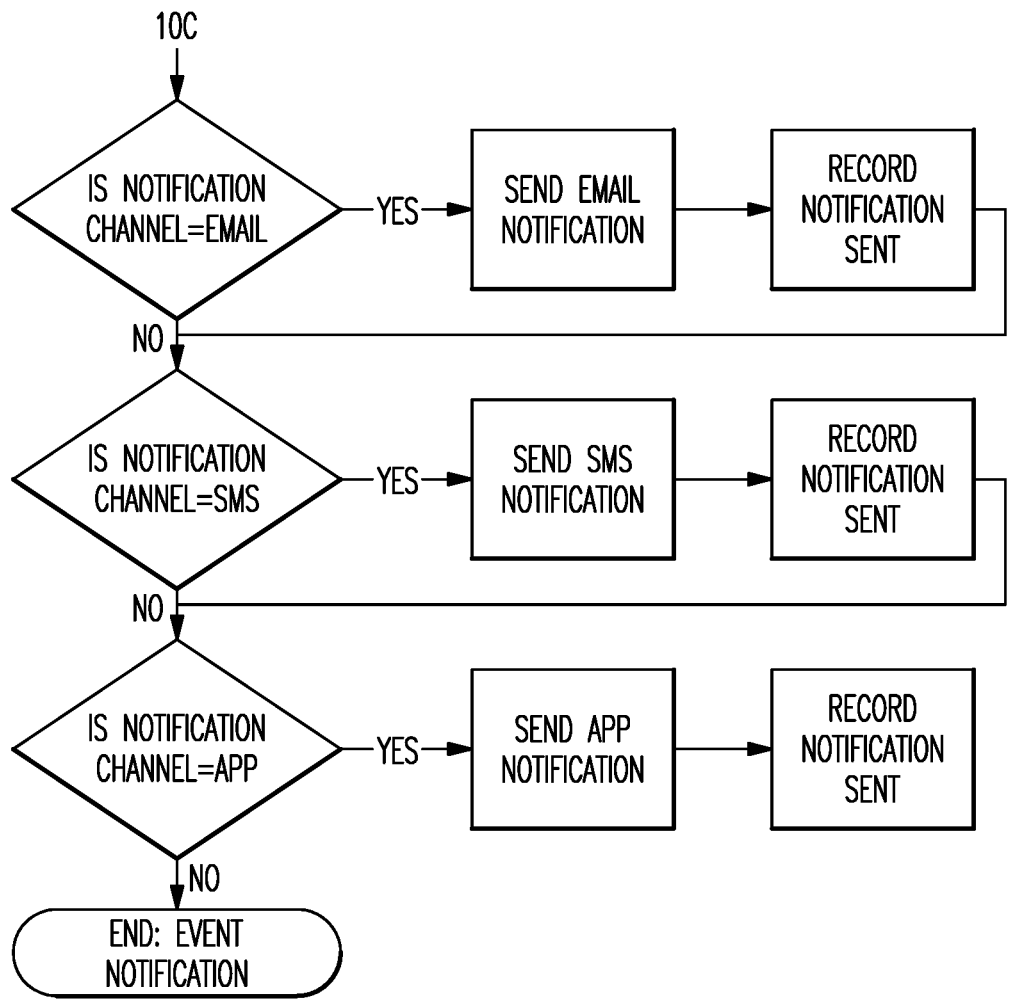
Figure 11B:
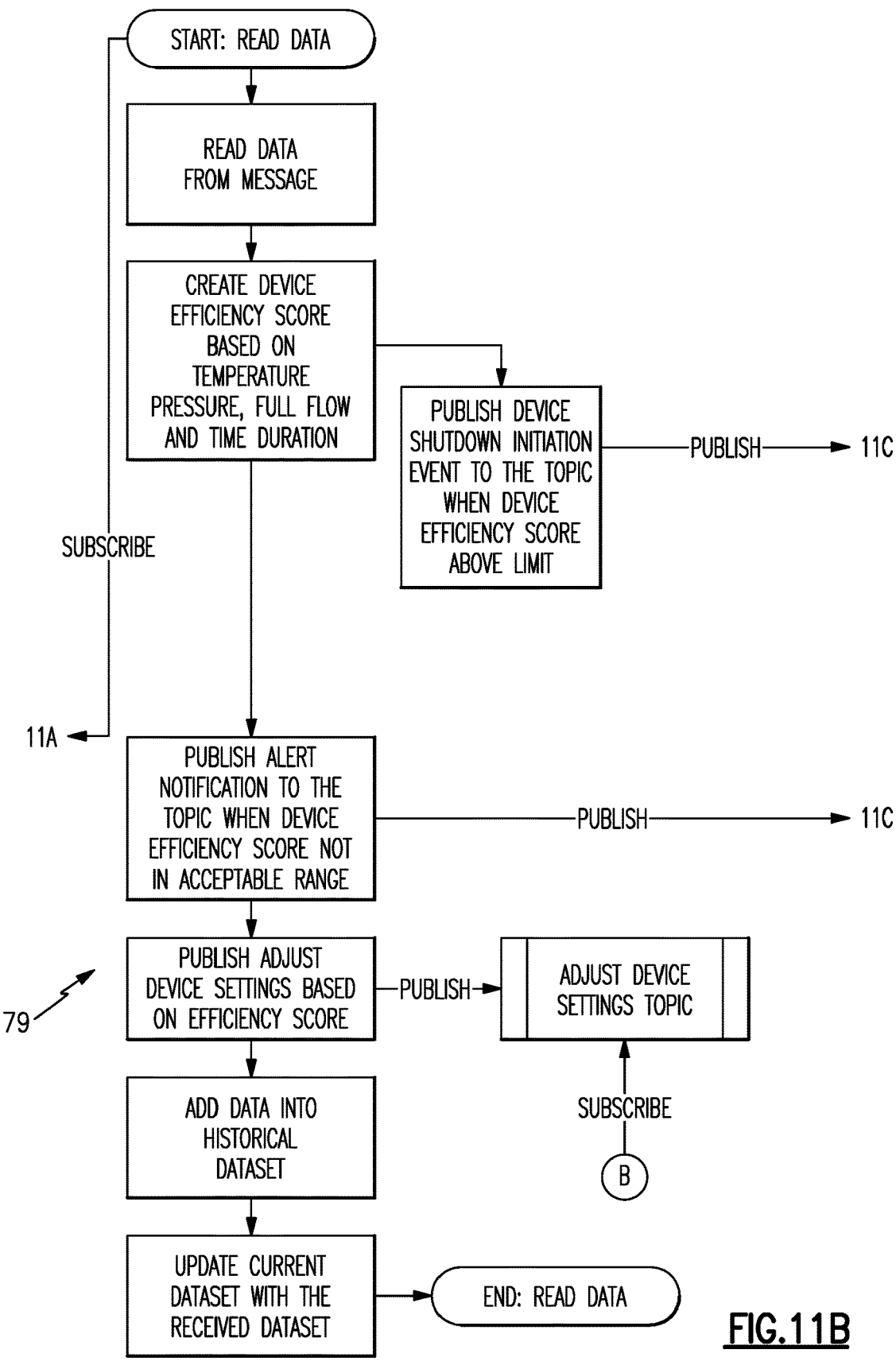
FIG. 11 is another workflow logic diagram that represents an example of a method for managing one or more mobile distribution stations. The size of the diagram exceeds what can be shown on a page. Therefore.
Figure 11C:
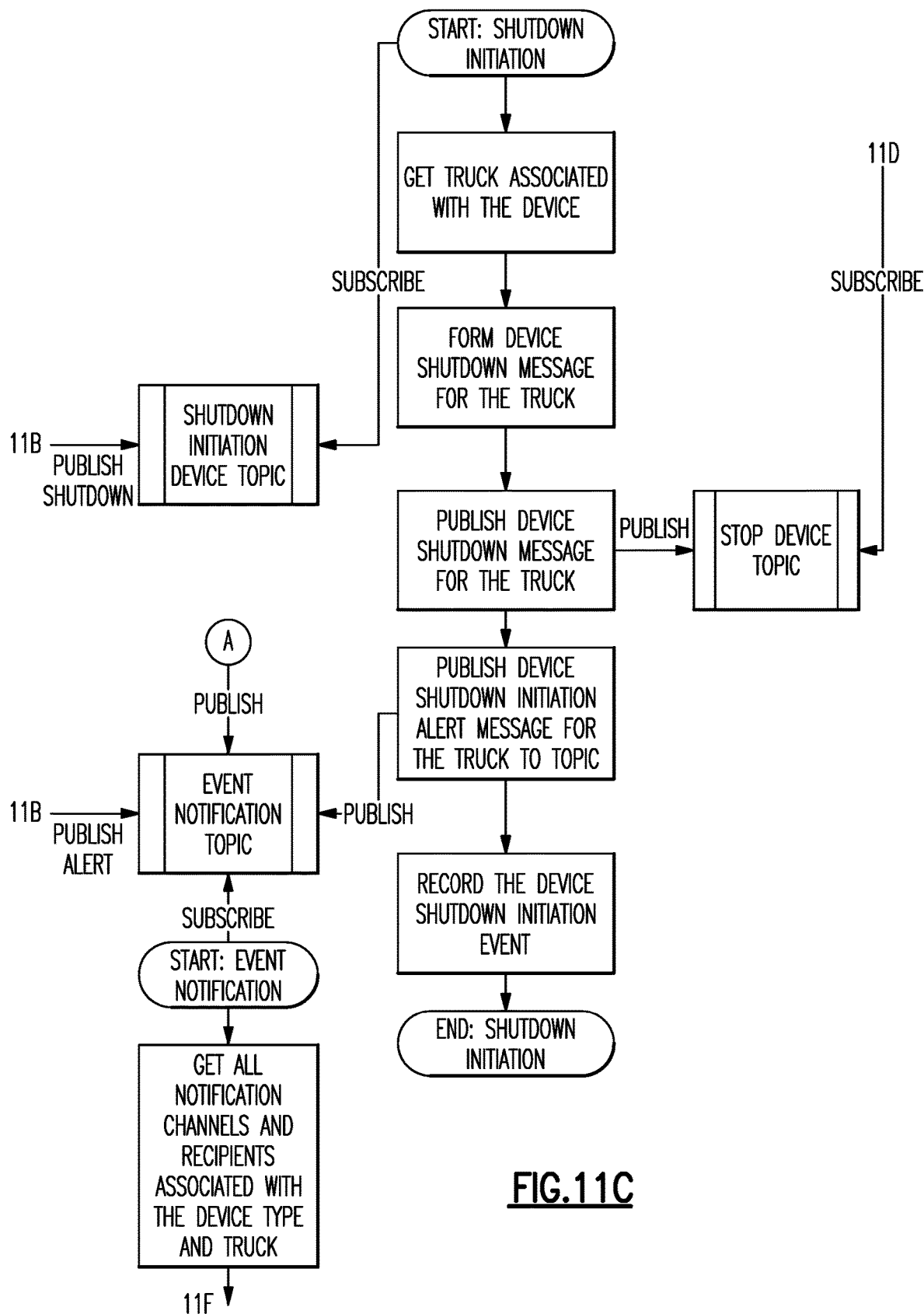
Figure 11D:
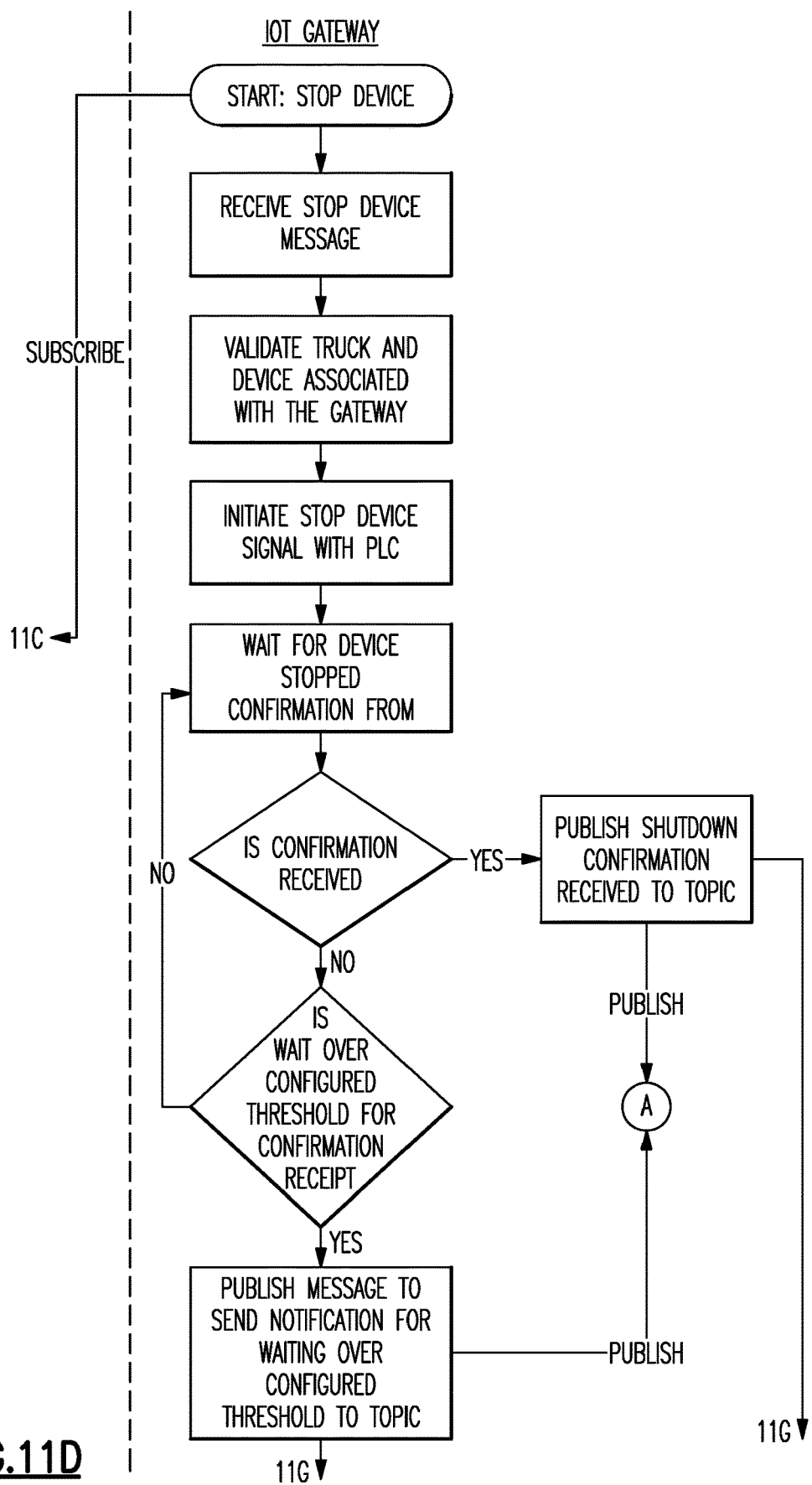
Figure 11E:
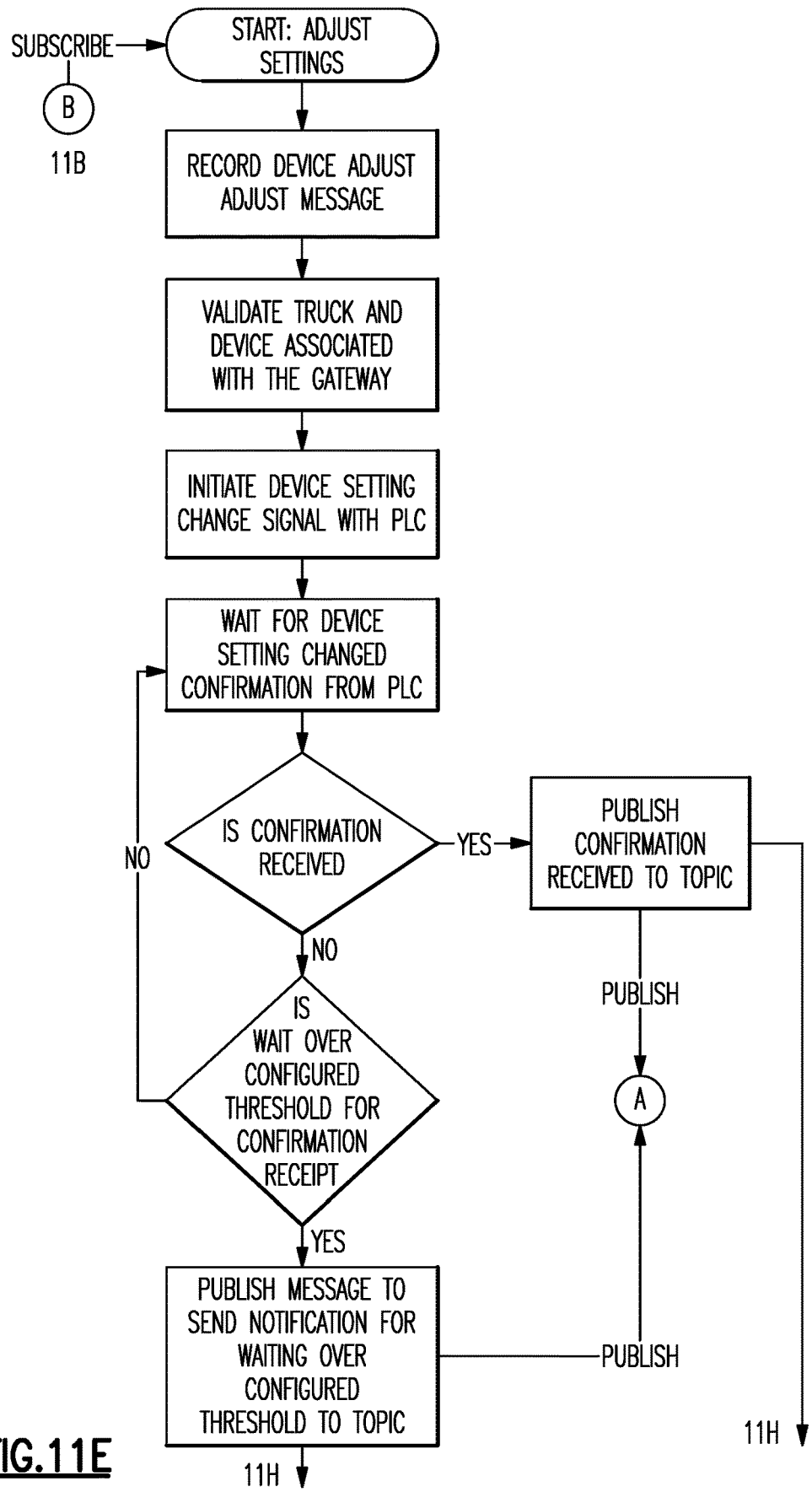
Figure 11F:
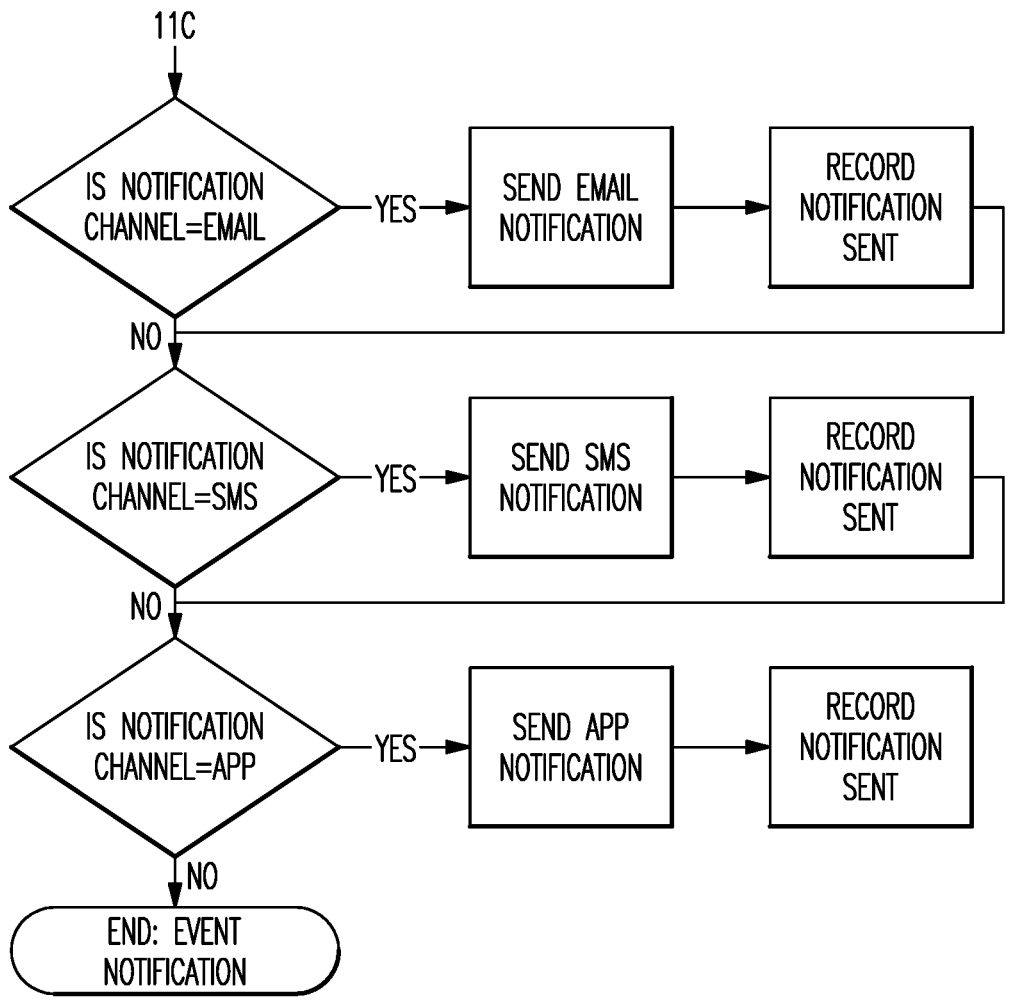
Figure 11G:
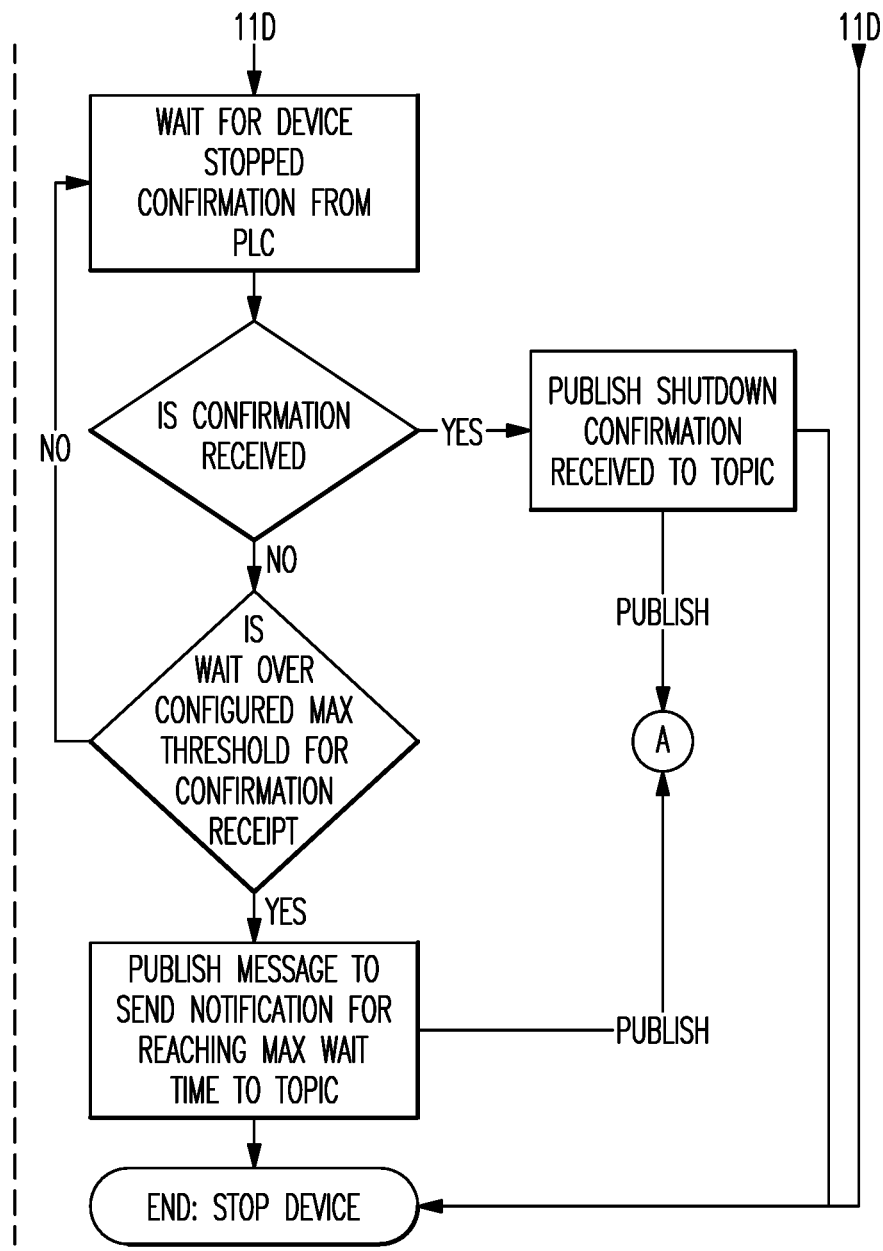
Figure 11H:
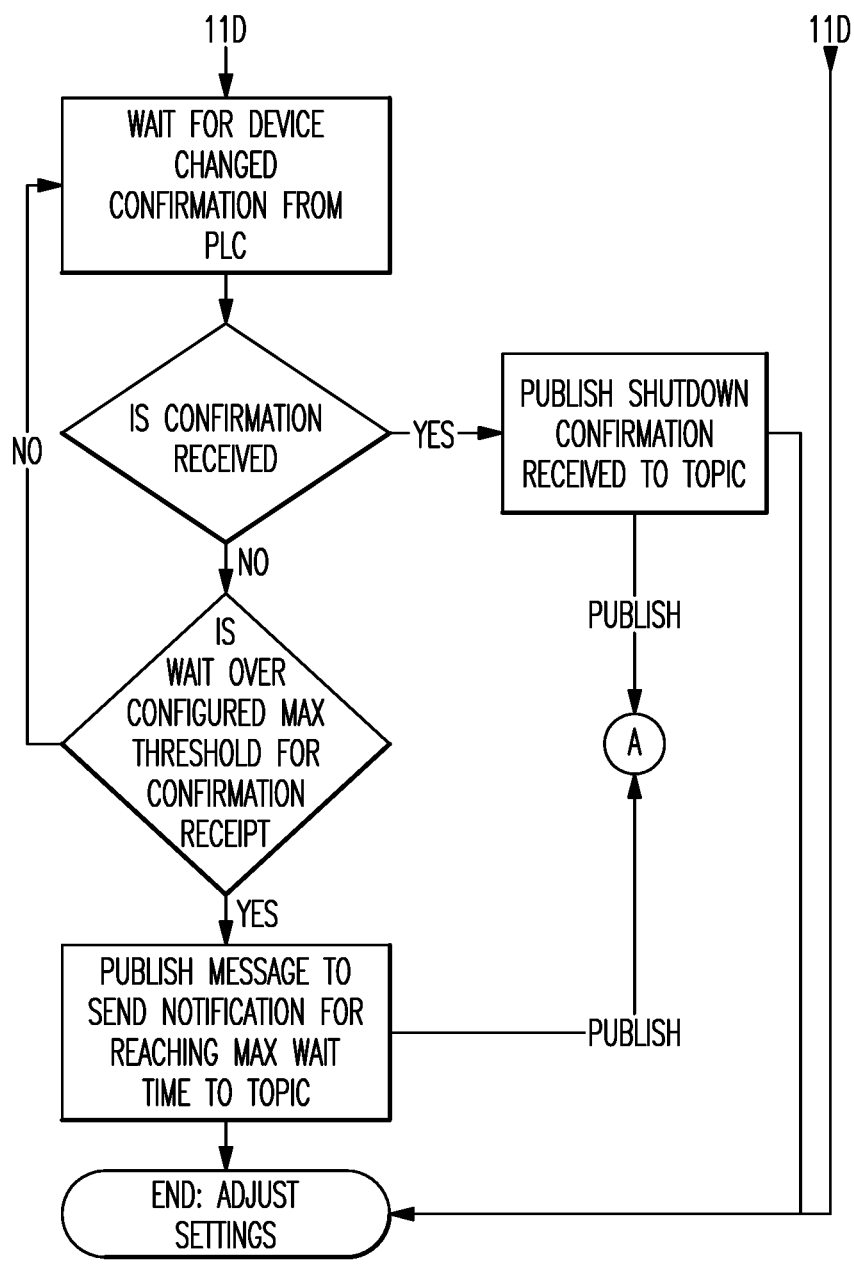

FIG. 10 illustrates a workflow logic diagram of an example control method 77 which can be implemented with the system 69 or with other configurations of one or more mobile distribution stations 20 and one or more servers. In general, the illustrated method 77 can be used to provide a shutdown instruction or an alert if operating parameter data of one or more mobile distribution stations 20 is outside of a preset limit. For instance, if fuel pressure or fuel temperature in one of the mobile distribution stations 20 exceeds one or more limits, the method 77 shuts down the mobile distribution station 20 and/or sends an alert so that appropriate action can, if needed, be taken in response to the situation. In particular, in hot-refueling implementations, the ability to automatically shut down or to provide a remote alert may facilitate enhancement of reliable and safe operation.

Referring to FIG. 10, one or more current or instantaneous operating parameters are read (i.e., by the controller 52). An operating parameter may include, but is not limited to, fuel temperature and fuel pressure. Other parameters may additionally or alternatively be used, such as pump speed or power and fuel flow. Parameters may be first order parameters based on first order readings from sensor signals, or second order parameters that are derived or calculated from first order parameters or first order sensor signals. For instance, temperature is a first order parameter and direct detection of temperature to produce signals representative of temperature constitute first order sensor signals. The product of temperature and pressure, for example, is a second order parameter that is based on first order sensor signals of each of temperature and pressure. As will be appreciated, there may be additional types of second order parameters based on temperature, pressure, power, flow, etc., which may or may not be weighted in a calculation of a second order parameter.

In this example, the current operating parameter is compared with a prior operating parameter stored in memory in the controller 52. A difference in the current operating parameter and the prior operating parameter is calculated to produce a change (delta) value in the operating parameter. The change value is used as the operating parameter data for control purposes in the method 77. The operating parameter data thus represents the change in the operating parameter from the prior reading to the current reading. Use of the change value as the operating parameter data serves to reduce the amount of data that is to be sent in connection with the method 77. For example, the actual operating parameter values may be larger than the change values and may thus require more memory and bandwidth to send than the change values. The change values are sampled and calculated at a predesignated interval rate. In this example, the interval rate is once per second. Each operating parameter is stored in memory for use as the next "prior" operating parameter for comparison with a subsequent "new" operating parameter reading. The controller 52 may be programmed to perform the above steps. As will be appreciated, the steps above achieve data efficiency, and actual values could alternatively or additionally be used if memory and bandwidth permit.

Each operating parameter data reading (i.e., change value) is published or sent via IoT (Internet of Things) Gateway to an IoT Platform, which may be implemented fully or partially on the server 71 and cloud device 75. The operating parameter data may also contain additional information, such as but not limited to, metadata with time stamp information and identification of the individual mobile distribution station 20. In this example, the operating parameter data of interest is associated with fuel pressure and fuel temperature. In the method 77, the operating parameter data for fuel temperature and fuel pressure are compared to, respectively, a preset fuel temperature shutdown limit and a preset fuel pressure shutdown limit. The shutdown limits may be temperature and pressure limits corresponding to rated limits of the pump 30, fuel line 32, and manifold 38, for example.

If the temperature or pressure are outside of the preset fuel temperature or pressure shutdown limits, the method 77 initiates a shutdown event. In this example, the shutdown event includes identifying the particular mobile distribution station 20 associated with the temperature or pressure that is outside of the preset limit, forming a shutdown instruction message, and publishing or sending the shutdown instruction message via the IoT Gateway to the corresponding identified mobile distribution station 20.

Upon receiving the shutdown instruction message, the controller 52 of the identified mobile distribution station 20 validates and executes the shutdown instruction. For instance, shutdown may include shutting off the pump 30 and closing all of the control valves 44. In this example, the method 77 includes a timing feature that waits for confirmation of shutdown. Confirmation may be generated by the controller 52 performing an electronic check of whether the pump 30 is off and the control valves 44 are closed. Confirmation may additionally or alternatively involve manual feedback via input into the controller 52 by a worker at the identified mobile distribution station 20.

Once shutdown is confirmed by the controller 52, confirmation of shutdown is published or sent via the Iot Gateway to the IoT Platform for subsequent issuance of an alert. If there is no confirmation of shutdown by a maximum preset time threshold, a non-confirmation of shutdown is published or sent for subsequent issuance of an alert.

If the temperature and/or pressure is not outside of the preset fuel temperature or pressure shutdown limits, the method 77 in this example continues to determine whether the fuel temperature and fuel pressure with are, respectively, outside of a preset fuel temperature threshold limit and a preset fuel pressure threshold limit. The threshold limits will typically be preset at levels which indicate a potential for shutdown conditions. For example, the threshold limits may be intermediate temperature or pressure levels which, if exceeded, may indicate an upward trend in temperature or pressure toward the shutdown limits. In one example, the threshold limits are rate of change thresholds. For instance, a change value in temperature and/or pressure that exceeds a corresponding threshold change limit may be indicative that temperature and/or pressure is rapidly elevating toward the shutdown condition.

In response to the temperature and/or pressure being outside of the preset fuel temperature or pressure threshold limits, the method 77 initiates an alert event. In this example, the alert event includes initiating an event notification. In the event notification, the method 77 conducts a lookup of notification channels and then issues an alert via one or more selected notification channels, such as an alert on the display 73a. As an example, the notification channels may be selected by user preferences and may include alerts by email, SMS (short message service), and/or mobile device app notification (e.g., banners, badges, home screen alerts, etc.). The event notification is also used for alerts of confirmation and non-confirmation of shutdown. The method 77 thus provides capability to nearly instantaneously issue an alert that can be immediately and readily viewed in real-time on the electronic device 73 so that appropriate action, if needed, can be taken. In one example, such actions may include adjustment of operation settings of the mobile distribution station 20, which may be communicated and implemented via the system 69 from the electronic device 73 to the mobile distribution station 20.

FIG. 11 illustrates a workflow logic diagram of an example control management method 79 which can be implemented with the method 77 and with the system 69 or with other configurations of one or more mobile distribution stations 20 and one or more servers. For example, the method 79 is used to identify shutdown conditions and/or remotely intelligently auto-manage operation of one or more mobile distribution stations 20. The initial portion of the method 79 with respect to generating operating parameters data may be similar to the method 77; however, the method 79 uses the operating parameter data to calculate an efficiency score and identify shutdown conditions or other actions to be taken in response to the efficiency score. For example, the efficiency score is a second order parameter and is a calculation based on multiple fuel operating parameters selected from fuel temperature, fuel pressure, fuel flow, and time. The efficiency score is then compared to an efficiency score shutdown limit. If the calculated efficiency score exceeds the limit, the method 79 initiates the shutdown event as described above. As an example, the efficiency score is the product of a safety score multiplied by one or more of a temperature score, a pressure score, a flow rate score, a tank level score, or the sum of two or more of these scores. For instance, the efficiency score is as shown in Equation I below.

Efficiency Score=Safety Score×(Temperature Score+ Pressure Score+Flow Rate Score+Tank Level Score). Equation I:

In one example, the safety score is a product of a safety factor and logic values of one or zero for each of the temperature score, the pressure score, the flow rate score, and the tank level score. Thus, if any of the temperature score, the pressure score, the flow rate score, or the tank level score fails, resulting in a logic value of zero, the efficiency score will be zero. In response to an efficiency score of zero, the method 79 initiates the shutdown event as described above. The logic values are assigned according to whether the given parameter is within a predetermined minimum/maximum range. If the parameter is within the range, the logic value is one and if the parameter is outside of the range, the value is zero. As an example, the safety score may be determined by:

Safety Score=(Safety Check Positive Response/Total Safety Checks)*(IF (Temperature Reading between MIN LIMIT and MAX LIMIT)THEN 1 ELSE 0))*(IF (Pressure Reading between MIN LIMIT and MAX LIMIT)THEN 1 ELSE 0))*(IF (Flow Rate Reading between MIN LIMIT and MAX LIMIT)THEN 1 ELSE 0))* (IF(Tank Inventory Reading between MIN LIMIT and MAX LIMIT)THEN 1 ELSE 0)), wherein Temperature Score=(((Temperature Reading−Min Limit)/Temperature Reading)+((Max Limit+ Temperature Reading)/Temperature Reading)))/ 2, Pressure Score=(((Pressure Reading−Min Limit)/ Pressure Reading)+((Max Limit+Pressure Reading)/Pressure Reading)))/2, Flow Rate Score=(((Flow Rate Reading−Min Limit)/ Flow Rate Reading)+((Max Limit+Flow Rate Reading)/Flow Rate Reading)))/2, and Tank Level Score=(((Tank Level Reading−Min Limit)/Tank Level Reading)+((Max Limit+Tank Level Reading)/Tank Level Reading)))/2.

In one example, the safety factor includes a calculation based on safety checks of a mobile distribution station 20. For instance, the safety factor is the quotient of positive or passing safety checks divided by the total number of safety check made. A safety check may involve periodic validation of multiple parameters or conditions on the site of a station 20 and/or in the station 20. As examples, the safety check may include validation that electrical power supply is fully functional (e.g., a generator), validation of oil levels (e.g., in a generator), validation of whether there are any work obstructions at the site, etc. Thus, each safety check may involve validation of a set of parameters and conditions. If validation passes, the safety check is positive and if validation does not pass the safety check is negative. As an example, if 5 safety checks are conducted for a station 20 and four of the checks pass and one does not pass, the safety factor is equal to four divided by five, or 0.8.

The method 79 also uses the efficiency score to actively intelligently auto-manage operation of one or more of the mobile distribution stations 20. For example, the efficiency score is compared in the method 79 with an efficiency score threshold limit or efficiency score range. If the efficiency score is outside of the limit or range, the method 79 initiates an adjustment event to adjust settings of the operating parameters of the mobile distribution station 20. For example, pumping rate or power may be changed to increase or decrease fuel pressure. In further examples in the table below, preset actions are taken in response to efficiency scores within preset ranges.

| Efficiency Score | Action |
| --- | --- |
| <=1 | SHUTDOWN |
| >1 AND <=2 | ALERT |
| >2 AND <=3 | ADJUST SETTINGS |
| >3 AND <=4 | NO ACTION |

The adjustment event may include forming an adjustment instruction message and publishing or sending the adjustment instruction message to the mobile distribution station 20 via the IoT Gateway. Upon receiving the adjustment instruction message the controller 52 of the mobile distribution station 20 validates and executes the message. The message constitutes a control action to change one or more of the operating parameters to move the efficiency score within the limit or range. As an example, pumping rate is changed to change fuel pressure. Other parameters may additionally or alternatively be adjusted to change the fuel efficiency score, such as but not limited to, fuel tank upper and lower thresholds, sequence of opening/closing control valves 44, and number of control valves 44 that may be open at one time. Thus, once implemented, the method 79 can serve to auto-adjust operation of one or more of the mobile distribution stations 20, without human intervention, to achieve enhanced or optimize fuel distribution.

In one example, a rate of fuel consumption of one or more pieces of the equipment may be calculated, and the upper and/or lower fuel level threshold settings are changed in response to the calculated rate of fuel consumption. For instance, if consumption is lower or higher than a given fuel level threshold setting warrants, the fuel level threshold setting is responsively auto-adjusted up or down for more efficient operation. For a low consumption rate, there may be a downward adjustment of the lower fuel level threshold, since there is lower likelihood that the low consumption rate will lead to a fully empty condition in the equipment. Similarly, for a high consumption rate, there may be an upward adjustment of the lower fuel level threshold, since there is higher likelihood that the high consumption rate will lead to a fully empty condition in the equipment. Thus, the mobile distribution station 20 can be operated more efficiently and safely by distributing fuel at proper times to ensure filling the equipment with desired safety margins.

Similar to the shutdown instruction message described above, the method 79 may include a timing feature that waits for confirmation of adjustment. Once adjustment is confirmed by the controller 52, confirmation of adjustment is published or sent via the Iot Gateway to the IoT Platform for subsequent issuance of an alert. If there is no confirmation of adjustment by a maximum preset time threshold, a non-confirmation of adjustment is published or sent for subsequent issuance of an alert. In further examples, the method 79 may exclude use of the efficiency score for purposes of shutdown or for purposes of intelligent auto-management. That is, the method 79 may employ the efficiency score for only one or the other of shutdown or intelligent auto-management.

Additionally or alternatively, the system 69 with one or more mobile distribution stations 20 and one or more servers may be used for centralized, intelligent auto-filling. For example, fuel levels may be tracked in real-time or near real-time. When a fuel level associated with one of the stations 20 reaches the lower threshold, described above, an instruction may be sent via the system 69 to active the pump 30 and open the appropriate control valve 44. Moreover, the system 69 can ensure that there is minimal or zero delay time from the time of identifying the low threshold to the time that filling begins. Thus, at least a portion of the functionality of the controllers 52 may be remotely and centrally based in the server of the system 69.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A distribution station comprising:
a mobile trailer;
at least one pump on the mobile trailer;
at least one manifold on the mobile trailer;
a fluid line connecting the at least one pump to the at least one manifold;
a bypass line leading into the fluid line between the at least one pump and the at least one manifold, the bypass line permitting fluid to be provided to the manifold without use of the at least one pump;
a plurality of reels on the mobile trailer, each said reel individually connected with the at least one manifold;
a plurality of hoses, each said hose connected with a different one of the reels;
a plurality of valves on the mobile trailer, each said valve situated between the at least one manifold and a respective different one of the reels;
a plurality of fluid level sensors, each said fluid level sensor connectable to an end of a different one of the hoses; and
a controller configured to individually open and close the valves responsive to the fluid level sensors.

2. The distribution station as recited in claim 1, wherein the bypass line extends from the fluid line to a free tip end.

3. The distribution station as recited in claim 1, further comprising a plurality of secondary fluid lines individually connecting the reels to the at least one manifold, and each of the secondary fluid lines has a flexible coupling.

4. The distribution station as recited in claim 3, wherein each of the secondary fluid lines has a first pipe section affixed with the at least one manifold and a second pipe section affixed with the respective reel, and the first and second pipe sections are connected by the flexible coupling.

5. The distribution station as recited in claim 4, wherein the flexible coupling includes first and second clamp members that are secured together by one or more fasteners, and a gasket around ends of the first and second pipe sections preventing escape of fluid.

6. The distribution station as recited in claim 5, wherein the ends of the first and second pipe sections are spaced apart in the flexible coupling.

7. The distribution station as recited in claim 3, wherein the flexible coupling includes a clamp.

8. The distribution station as recited in claim 3, wherein the secondary fluid line has multiple portions of different diameters.

9. The distribution station as recited in claim 8, wherein the multiple portions of different diameters include a first diameter portion, a second diameter portion, and a third diameter portion, with the second diameter portion being between the first and third diameter portions, and the first diameter portion and the third diameter portions have larger diameters than the second diameter portion.

10. The distribution station as recited in claim 9, wherein the first and third diameter portions are larger in diameter than the second diameter portion by a factor of 1.1 to 2.

11. The distribution station as recited in claim 10, wherein the first and third diameter portions are of equal diameter within 10%.

12. The distribution station as recited in claim 1, further comprising a plurality of hose guides through which one or more hoses are deployed, each said hose guide including at least one roller.

13. The distribution station as recited in claim 1, wherein the mobile trailer includes a compartment housing a generator, the generator powering the at least one pump, the controller, and the valves.

14. The distribution station as recited in claim 13, further comprising an auxiliary generator connection port electrically connected with the at least one pump, the controller, and the valves.

15. The distribution station as recited in claim 14, wherein the auxiliary generator connection port is outside of the compartment.

16. A distribution station comprising:
a mobile trailer;
at least one pump on the mobile trailer;
at least one manifold on the mobile trailer, the at least one manifold fluidly connected with the at least one pump;
a plurality of reels on the mobile trailer, each said reel individually connected with the at least one manifold;
a plurality of secondary fluid lines individually connecting the reels to the at least one manifold, each said secondary fluid line having a flexible coupling;
a plurality of hoses, each said hose connected with a different one of the reels;
a plurality of valves on the mobile trailer, each said valve situated between the at least one manifold and a respective different one of the reels;
a plurality of fluid level sensors, each said fluid level sensor connectable to an end of a different one of the hoses; and
a controller configured to individually open and close the valves responsive to the fluid level sensors.

17. The distribution station as recited in claim 16, wherein each of the secondary fluid lines has a first pipe section affixed with the at least one manifold and a second pipe section affixed with the respective reel, the first and second pipe sections are connected by the flexible coupling, the flexible coupling includes first and second clamp members that are secured together by one or more fasteners, and a gasket around ends of the first and second pipe sections preventing escape of fluid.

18. The distribution station as recited in claim 17, wherein the secondary fluid line has multiple portions of different diameters, the multiple portions of different diameters include a first diameter portion, a second diameter portion, and a third diameter portion, with the second diameter portion being between the first and third diameter portions, and the first diameter portion and the third diameter portions have larger diameters than the second diameter portion.

19. The distribution station as recited in claim 18, wherein the first and third diameter portions are larger in diameter than the second diameter portion by a factor of 1.1 to 2, and the first and third diameter portions are of equal diameter within 10%.

\* \* \* \* \*